(12) United States Patent
Park et al.

(10) Patent No.: US 12,619,124 B2
(45) Date of Patent: May 5, 2026

(54) DEVICE FOR SWITCHING OPTICAL SIGNAL

(71) Applicant: ELECTRONICS AND TELECOMMUNICATIONS RESEARCH INSTITUTE, Daejeon (KR)

(72) Inventors: Jae Gyu Park, Daejeon (KR); Sung Hoon Hong, Daejeon (KR); Soo Jung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 245 days.

(21) Appl. No.: 18/319,882

(22) Filed: May 18, 2023

(65) Prior Publication Data

US 2023/0375896 A1 Nov. 23, 2023

(30) Foreign Application Priority Data

May 18, 2022 (KR) ......................... 10-2022-0060747

(51) Int. Cl.
*G02F 1/313* (2006.01)
*G02B 6/35* (2006.01)
(52) U.S. Cl.
CPC ......... *G02F 1/3132* (2013.01); *G02B 6/3546* (2013.01); *G02B 6/355* (2013.01); *G02F 1/3138* (2013.01)
(58) Field of Classification Search
CPC .... G02F 1/3132; G02F 1/3133; G02F 1/3137; G02F 1/3138; G02B 6/3536; G02B 6/3546; G02B 6/355
See application file for complete search history.

(56) References Cited

U.S. PATENT DOCUMENTS 5,255,334 A * 10/1993 Mak ...................... G02F 1/3132
385/9
5,915,053 A 6/1999 Jeong et al.
(Continued)

FOREIGN PATENT DOCUMENTS

| CN | 109655975 A | 4/2019 |
| CN | 112433295 A | 3/2021 |
| WO | 2011069225 A1 | 6/2011 |

OTHER PUBLICATIONS

B. Bhandari et al. Reconfigurable fiber-to-waveguide coupling module enabled by phase-change material incorporated switchable directional couplers. Scientific Reports, 12, May 4, 2022 (https://doi.org/10.1038/s41598-022-11386-3) (Year: 2022).*

(Continued)

*Primary Examiner* — Michael Stahl
(74) *Attorney, Agent, or Firm* — Rabin & Berdo, P.C.

(57) ABSTRACT

Proposed is a device for switching an optical signal, the device including a first waveguide constituting an input port and a first output port; and a second waveguide constituting a second output port, wherein the first waveguide is formed of a first material, wherein the second waveguide is formed of the first material and contains a second material, wherein a gap between the first and second waveguides has a first value in a first section, a gap therebetween has a value increasing from the first value to a second value in a second section, and a gap therebetween has a third value in a third section, wherein at least one portion of the first section and at least one portion of the second section overlap in the one section, and wherein a grating structure applies to the first and second waveguides in at least one portion of the first section.

19 Claims, 33 Drawing Sheets

(56)  References Cited

U.S. PATENT DOCUMENTS

| | | | | |
|---|---|---|---|---|
| 6,233,378 | B1 * | 5/2001 | Sun | G02F 1/3132 |
| | | | | 385/22 |
| 6,842,563 | B2 | 1/2005 | Zhang et al. | |
| 6,876,793 | B1 | 4/2005 | Ling et al. | |
| 9,292,752 | B2 | 3/2016 | Suzuki et al. | |
| 2016/0054521 | A1 * | 2/2016 | Kunishima | G02B 6/125 |
| | | | | 385/14 |
| 2018/0284492 | A1 * | 10/2018 | Fang | G02F 1/225 |
| 2019/0170946 | A1 | 6/2019 | Tu | |
| 2019/0253776 | A1 | 8/2019 | Mazed et al. | |
| 2019/0302362 | A1 | 10/2019 | Lee et al. | |
| 2021/0141157 | A1 | 5/2021 | Yoo et al. | |
| 2021/0149271 | A1 * | 5/2021 | Moon | G02F 1/3132 |
| 2021/0333575 | A1 | 10/2021 | Hu et al. | |
| 2021/0396934 | A1 * | 12/2021 | Matsui | G02F 1/3132 |
| 2023/0221490 | A1 * | 7/2023 | Bhaskaran | G02B 6/2733 |
| | | | | 385/11 |

OTHER PUBLICATIONS

T. Teo et al. Comparison and analysis of phase change materials-based reconfigurable silicon photonic directional couplers. Optical Materials Express, 12:2, Feb. 1, 2022 (https://doi.org/10.1364/OME.447289) (Year: 2022).*

H. Xie et al. Ultra-compact subwavelength-grating-assisted polarization-independent directional coupler. IEEE Photonics Technology Letters, 31:18, Sep. 15, 2019 (https://doi.org/10.1109/LPT.2019.2937890) (Year: 2019).*

Peipeng Xu et al., "Low-loss and broadband nonvolatile phase-change directional coupler switches", ACS Photonics 2019, 6, 553-557, Jan. 7, 2019.

* cited by examiner

• T1 = 0.5μm, T2 = 20nm
• w1 = 0.6μm, w2 = 0.6μm
• g = 0.2μm
• 5 period

Mode matching condition 적용
* SiN ↔ c-GST/SiN: strong mode mismatching
* SiN ↔ a-GST/SiN: weak mode mismatching

| Input | GST up | GST down | Output |
|-------|--------|----------|--------|
| 1 | c | c | 3 |
| | c | a | 4 |
| | a | c | 2 |
| 3 | c | c | 1 |
| | c | a | 5 |
| | a | c | 6 | a:amorphous, c:crystal

| Input | GST up | GST down | Output |
|---|---|---|---|
| Port 1 | c | a | Port 3 |
| | a | c | Port 2 | a: amorphous, c: crystal

FIG. 16

DEVICE FOR SWITCHING OPTICAL SIGNAL

CROSS-REFERENCE TO RELATED APPLICATION

This application claims priority from and the benefit of Korean Patent Application No. 10-2022-0060747, filed on May 18, 2022, which is hereby incorporated by reference for all purposes as if set forth herein.

BACKGROUND

Field

Exemplary embodiments of the present disclosure relates to a device for transmitting an optical signal and, more particularly, to a device for switching an optical signal.

Discussion of the Background

In the fields, such as 5th generation (5G)/6th generation (6G) communication, data center, and high-performance computing (HPC), research has been actively conducted on photonics integrated circuits (PICs) that are capable of performing high-speed data processing low power consumption in order to process a sharply increasing amount of data in a large amount with less power consumption. Specifically, the results of much research on various photonics elements, such as an optical modulator, an optical switch, an optical distributor, and a polarization controller have been reported. Among these photonics elements, the optical switch is an element that serves to perform switching for transmission of a large amount of data at an ultrahigh speed without any delay over a complex optical network. Usually, the optical switch employs an N×N array structure in order to make a connection to the complex networks. The optical switches have been developed as types of PICs large-scale integrated on one chip. In order to deal with an exponentially increasing amount of data, the number of switches has been rapidly increasing. Accordingly, there has been a significant increase in power consumption by the switches. Therefore, to achieve large-scale integration and low power consumption, it is crucial to minimize the size of each photonic switch.

SUMMARY

Various embodiments are directed to a device for switching an optical signal in a more effective manner.

Furthermore, various embodiments are directed to a device for switching an optical signal at a high speed with less power consumption.

Furthermore, various embodiments are directed to a device for switching an optical signal using a small-sized element.

In an embodiment, a device for switching an optical signal includes a first waveguide constituting an input port and a first output port; and a second waveguide constituting a second output port, wherein the first waveguide is formed of a first material over all sections, wherein the second waveguide is formed of the first material over the all sections and contains a second material that experiences phase transition according to temperature, the second material being coupled to an upper end portion of the first material in one section, wherein a gap between the first waveguide and the second waveguide uniformly has a first value in a first section, a gap between the first waveguide and the second waveguide has a value increasing from the first value to a second value in a second section, and a gap between the first waveguide and the second waveguide uniformly has a third value in a third section, wherein at least one portion of the first section and at least one portion of the second section overlap in the one section, and wherein a grating structure applies to the first waveguide and the second waveguide in at least one portion of the first section.

In an embodiment, in the device, the grating structure may apply to the first material and the second material in at least one portion of the first section.

In an embodiment, in the device, the grating structure to apply to the first waveguide may be formed by starting at a front end of the second waveguide.

In an embodiment, in the device, the grating structure to apply to the second waveguide may be formed by starting at one end of the second waveguide.

In an embodiment, in the device, the second material may have a narrower width than the first material.

In an embodiment, in the device, the grating structure may be formed in lateral surfaces of the first waveguide and the second waveguide, the lateral surfaces facing each other.

In an embodiment, in the device, the first material contains SiN, and the second material may contain $Ge_2Sb_2Te5$ (GST).

In an embodiment, in the device, the grating structure may be in the form of a grating with a period shorter than a wavelength of the optical signal.

In an embodiment, in the device, in a case where the optical signal that is input into the input port needs to be output to the first output port, the second material may be controlled in such a manner as to be in a crystal state.

In an embodiment, in the device, in a case where the optical signal that is input into the input port needs to be output to the second output port, the second material may be controlled in such a manner as to be in an amorphous state.

In an embodiment, in the device, whether or not the first waveguide and the second waveguide may be matched in mode with each other is determined based on a state of the second material.

In an embodiment, in the device, in a case where the second material is in an amorphous state, the first waveguide and the second waveguide may be matched in mode with each other, and, in a case where the second material is in a crystal state, the first waveguide and the second waveguide may be mismatched in mode with each other.

In an embodiment, in the device, in a case where the second material is in an amorphous state, the first waveguide and the second waveguide may be relatively slightly mismatched in mode with each other, and, in a case where the second material is in a crystal state, the first waveguide and the second waveguide may be relatively significantly mismatched in mode with each other.

In an embodiment, a device for switching an optical signal includes a first waveguide constituting a first port; a second waveguide constituting a second port; and a third waveguide constituting a third port, wherein the first waveguide is formed of a first material over all sections, wherein the second waveguide is formed of the first material over the all sections, and contains a first metamaterial as a second material that experiences phase transition according to temperature, the second material being coupled to an upper end portion of the first material in one section, wherein the third waveguide is formed of the first material over the all sections, and contains a second metamaterial as the second material that experiences the phase transition according to temperature, the second material being coupled to the upper end portion of the first material in one section, and wherein the optical signal that is input into the first port is output to one of the second port and the third port on the basis of a combination of a state of the first metamaterial and a state of the second metamaterial.

In an embodiment, in the device, the first waveguide may have the first port on one end portion thereof and may have a fourth portion on the other end portion thereof, the second waveguide may have the second port on one end portion thereof and may have a fifth port on the other end portion thereof, the third waveguide may have the third port on one end portion thereof and may have a sixth port on the other end portion thereof, the optical signal that is input into the first port may be output to one of the second port, the third port, and the fourth port on the basis of the combination of the state of the first metamaterial and the state of the second metamaterial, and the optical signal that is input into the fourth port may be output to one of the fifth port, the sixth port, and the first port on the basis of the combination of the state of the first metamaterial and the state of the second metamaterial.

In an embodiment, in the device, the first waveguide and the second waveguide may have a gap that is at or below a threshold value, and a grating structure may be formed in lateral surfaces of the first waveguide and the second waveguide, the lateral surfaces facing each other, and the first waveguide and the third waveguide may have a gap that is at or below a threshold value, and a grating structure may be formed in lateral surfaces of the first waveguide and the third waveguide, the lateral surfaces facing each other.

In an embodiment, in the device, a tapered structure may be formed in a region of the first waveguide, the region employing the grating structure.

In an embodiment, the device may further include: a fourth waveguide vertically intersecting the second waveguide and, along with the third waveguide, forming a structure of a directional coupler; and a plurality of switch elements, each including the first waveguide, the second waveguide, the third waveguide, and the fourth waveguide, wherein the plurality of switch elements may be arranged in a two-dimensional geometric array, and wherein a plurality of optical signals that are input into switch elements, respectively, in the first column may be output to switch elements, respectively, in the last column or to switch elements, respectively, in the last row, on the basis of states of the metamaterials contained in the plurality of switch elements, respectively.

In an embodiment, the device may further include: a fourth waveguide vertically intersecting the second waveguide; and a fifth waveguide, along with the third waveguide and, along with the fourth waveguide, forming a directional coupler; and a plurality of switch elements, each including a set of the first waveguide, the second waveguide, the third waveguide, the fourth waveguide, and the fifth waveguide, wherein the plurality of switch elements may be arranged in a two-dimensional geometric array, wherein a plurality of optical signals that are input into switch elements, respectively, in the first column may be output to switch elements, respectively, in the last column or to switch elements, respectively, in the last row, on the basis of states of the metamaterials contained in the plurality of switch elements, respectively, and wherein a plurality of optical signals that are input into switch elements, respectively, in the last row may be output to switch elements, respectively, in the first row or to switch elements, respectively, in the first column, on the basis of states of the metamaterials contained in the plurality of switch elements, respectively.

In an embodiment, a device for switching an optical signal includes: a first waveguide constituting a first port and a second port; a second waveguide constituting a third port and a fourth port the second waveguide vertically intersecting the first waveguide; a third waveguide arranged along the first waveguide in such a manner that a region, adjacent to the first port, of the third waveguide and the first port have a gap that is at or below a threshold value, and arranged along the second waveguide in such a manner that a region, adjacent to the third port, of the third waveguide and the third port have the gap that is at or below the threshold value; a fourth waveguide arranged along the first waveguide in such a manner that a region, adjacent to the second port, of the fourth waveguide and the second port have the gap that is at or below the threshold value, and arranged along the second waveguide in such a manner that a region, adjacent to the third port, of the fourth waveguide and the third port have the gap that is at or below the threshold value; a fifth waveguide arranged along the first waveguide in such a manner that a region, adjacent to the first port, of the fifth waveguide and the first port have the gap that is at or below the threshold value, and arranged along the second waveguide in such a manner that a region, adjacent to the fourth port, of the fifth waveguide and the fourth port have the gap that is at or below the threshold value; and a sixth waveguide arranged along the first waveguide in such a manner that a region, adjacent to the second port, of the sixth waveguide and the second port have the gap that is at or below the threshold value, and arranged along the second waveguide in such a manner that a region, adjacent to the fourth port, of the sixth waveguide and the fourth port have the gap that is at or below the threshold value, wherein the first waveguide and the second waveguide are formed of a first material over all sections, wherein each of the third waveguide, the fourth waveguide, the fifth waveguide, and the sixth waveguide is formed of the first material over the all sections, and is formed of a second material that experiences phase transition according to temperature, the second material being coupled to an upper end portion the first material in one section, and wherein an optical signal that is input into the first port is output to one of the second port, the third port, and the fourth port on the basis of a combination of states of metamaterials contained in the third waveguide, the fourth waveguide, the fifth waveguide, and the sixth waveguide, respectively.

The optical signal can be effectively switched through a photonic switch that is proposed according to the present disclosure.

The present disclosure is not limited to the above-mentioned effect. From the following description, effects that have not been mentioned earlier but are achievable would be readily apparent to a person of ordinary skill in the art to which the present disclosure pertains.

BRIEF DESCRIPTION OF THE DRAWINGS

FIG. 16 is a diagram illustrating an example of a structure of an N×N channel bidirectional photonic switch according to a thirteenth embodiment of the present disclosure.

DETAILED DESCRIPTION OF THE ILLUSTRATED EMBODIMENTS

Figure 1A:
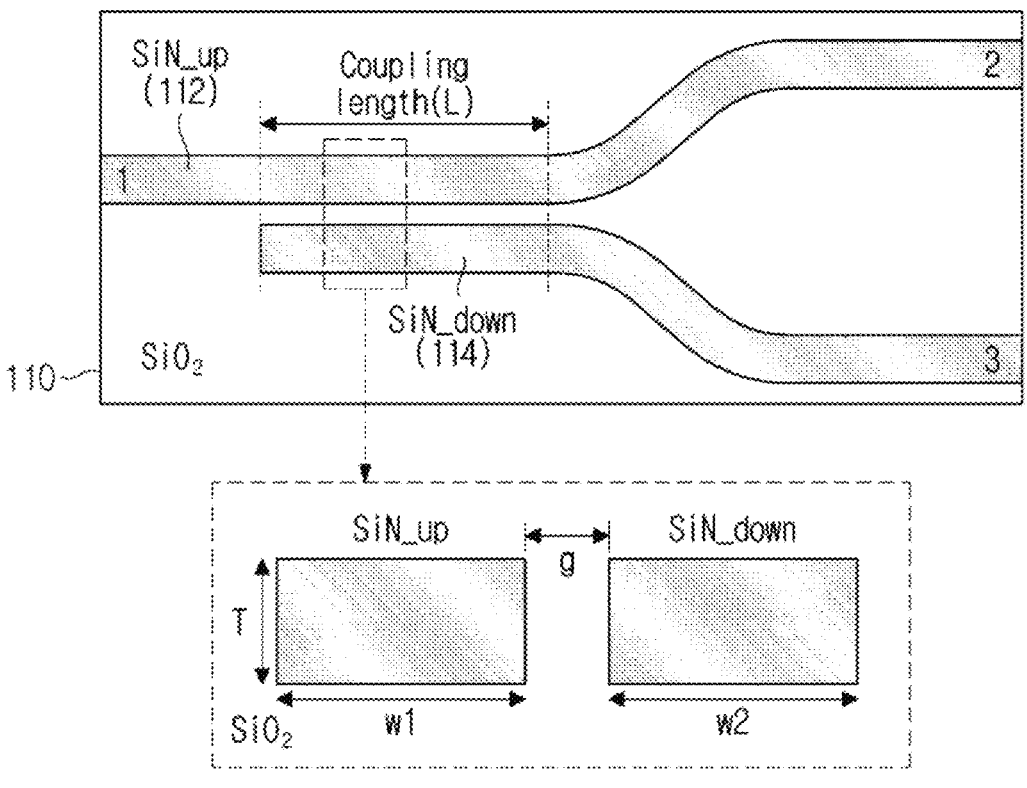
FIG. 1A is a diagram illustrating a structure of a SiN directional coupler.

Embodiments of the present disclosure will be described in detail below with reference to the accompanying drawings in such a manner that a person of ordinary skill in the art to which the present disclosure pertains is enabled to practice them without undue experimentation. However, the present disclosure may be practiced in various forms and is not limited to the embodiments described below.

Configurations or functions known in the related art that are necessary to describe the embodiments of the present disclosure, but are determined to make the nature and gist of the present disclosure obfuscated, detailed descriptions thereof are omitted. A constituent element according to each of the embodiments of the present disclosure that do not relate to the description of the present disclosure is omitted from the drawings, and the same constituent elements are given the same reference numeral.

In the present disclosure, when a constituent element is referred to as being "connected to," being "combined with," and having "access to one other constituent element, this means that a constituent element may be directly connected to one other constituent element or may be indirectly connected to one other constituent with an intervening constituent element in between. When the expression "includes a constituent element" or "have a constituent element" is used, unless otherwise described, this expression means "further includes one or more other constituent elements," not "excludes any other constituent element."

In the present disclosure, the terms "first," "second," and so on are used only to distinguish one constituent element from another constituent element, and unless otherwise described, no limitation is imposed on the order of constituent elements, the importance of each of the constituent elements, or the like. Therefore, without departing from the spirit of the present disclosure, a first constituent element according to an embodiment may also be referred to as a second constituent element according to another embodiment, and similarly, a second constituent element according to an embodiment may also be referred to as a first constituent element according to another embodiment.

In the present disclosure, constituent elements are distinguished in order to definitely describe a feature of each of the constituent elements, and this does not mean that the constituent elements are necessarily separated from each other. That is, a plurality of constituent elements may be integrated, in hardware or software, into one piece, and one constituent element may be separated, in hardware or software, into a plurality of constituent elements. Therefore, although not specifically mentioned, an embodiment resulting from the integration or an embodiment resulting from the separation falls within the scope of the present disclosure.

In the present disclosure, constituent elements that are described according to various embodiments are not necessarily intended to be essential constituent elements, and one or several thereof may be selective. Therefore, an embodiment including constituent elements, selected from among constituent elements described below according to each of the embodiments, also falls within the scope of the present disclosure. In addition, an embodiment, which results from adding one or more constituent elements to the constituent elements described below according to the various embodiments, also falls within the scope of the present disclosure.

Advantages and features of the present disclosure, and methods of achieving the advantages and features will be apparent from the embodiments that are described in detail below with reference to the accompanying drawings. However, the present disclosure is not limited to the embodiments that will be disclosed below and may be practiced in various different forms. The embodiments are only described to make a complete disclosure of the present disclosure and to provide a person of ordinary skill in the art to which the present disclosure pertains with notice of the scope of the disclosure.

The present disclosure relates to an apparatus for switching an optical signal and a photonic switch that switches the optical signal. The present disclosure proposes a structure of the photonic switch that is made of a metamaterial. Particularly, the present disclosure relates to a photonics element technology that switches the optical signal by applying the metamaterial to a directional coupler employing a sub-wavelength grating structure.

In recent years, results of research on the photonic switch to which a technology for a Mach-Zehnder interferometer or microelectromechanical systems (MEMS) applies have been reported. A photonic switch that uses the Mach-Zehnder interferometer has a size of $100 \times 500 \ \mu m^2$ or greater and a photonic switch that uses the MEMS has a size of approximately $100 \times 100 \ \mu m^2$ or greater. A photonic switch that uses a Si directional coupler has been reported. This photonic switch has a smaller size of $\sim 3 \times 10 \ \mu m^2$ than the photonic switches that use the Mach-Zehnder interferometer and the MEMS, respectively. Development of microscopic photonic switches is continuously required in order to achieve the advantage of not only increasingly reducing the size of the photonic switch by increasing the degree of integration, but also decreasing power consumption.

A structure of the typical SiN directional coupler and an example of a result of an imitating experiment associated with the structure are as follows.

FIG. 1A is a diagram illustrating a structure of the SiN directional coupler. FIG. 1A illustrates the structure of the typical directional coupler. With reference to FIG. 1A, a directional coupler 110 includes two SiN optical waveguides 112 and 114. The two SiN optical waveguides 112 and 114 are arranged in parallel with each other. The SiN optical waveguides 112 and 114 have a thickness of 0.5 μm. The SiN optical waveguide 112 positioned above has a width w1 of 0.6 μm, and the SiN optical waveguide 114 positioned below has a width w2 of 0.6 μm. A gap g between the SiN optical waveguides 112 and 114 is 0.4 μm. The two in-parallel optical waveguides 112 and 114 have an input port 1, an output port 2, and an output port 3. The optical signal that is input into the input port 1 propagates along the SiN optical waveguide (SiN-up) 112. Then, the optical signal flows to the SiN optical waveguide (SiN-down) 114 positioned below, due to evanescent coupling between the two SiN optical waveguides 112 and 114 that operate in two modes, respectively. At this point, when the gap between the SiN optical waveguides 112 and 114 in parallel with each other is increased using a curved optical waveguide structure, the optical signal that propagates to the SiN optical waveguide (SiN_down) 114 positioned below is suppressed from flowing back to the SiN optical waveguide (SiN-up) 112 positioned above. Accordingly, the optical signal that is input into the input port 1 may be output to the output port 3.

Figure 1B:
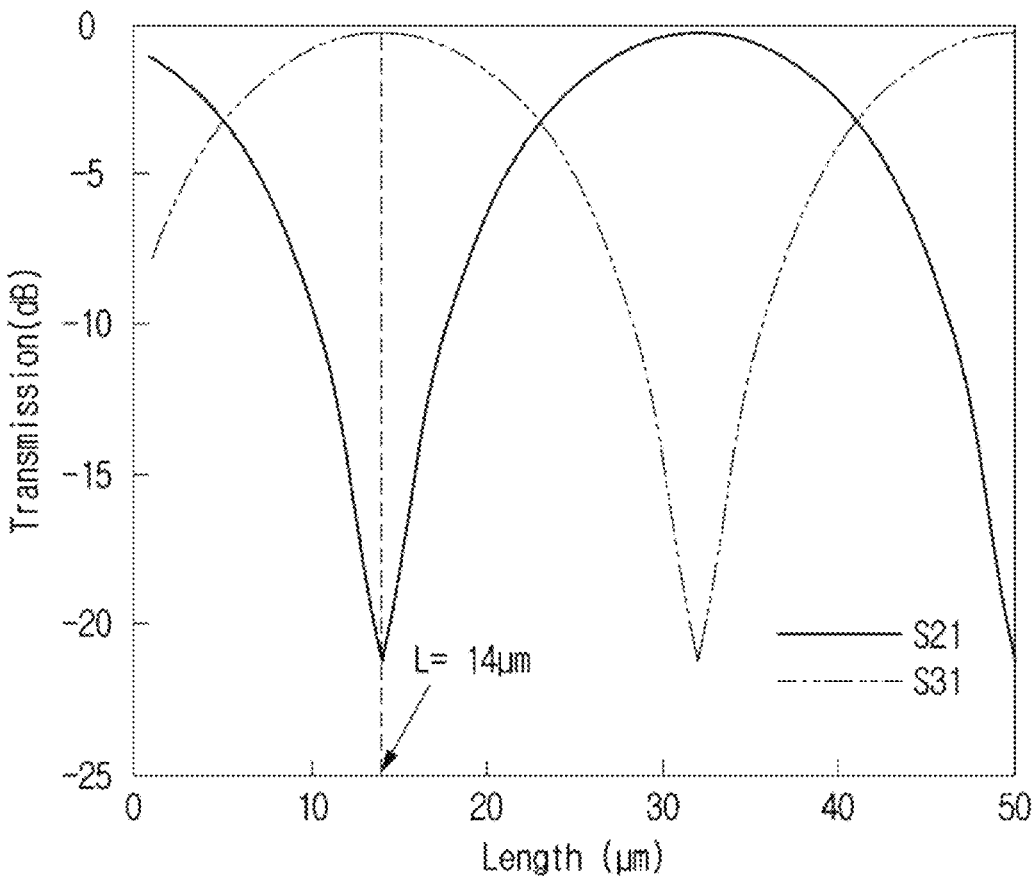
FIG. 1B is a graph showing the intensity of an optical signal that is output from the SiN directional coupler.

FIG. 1B is a graph showing the intensity of the optical signal that is output from the SiN directional coupler. FIG. 1B shows the intensities of the optical signals at the output port 2 and the output port 3 that are computed according to a varying coupling length L. From FIG. 1B, it can be seen that the intensity of the optical signal is increased with the coupling length L at the output port 2, but decreased with the coupling length L at the output port 3 and that the intensity of the optical signal is decreased with the coupling length L at the output port 2, but increased with the coupling length L at the output port 3. When L=14 μm, most of the optical signals that are input into the input port 1 flow to the output port 3

Figure 1C:
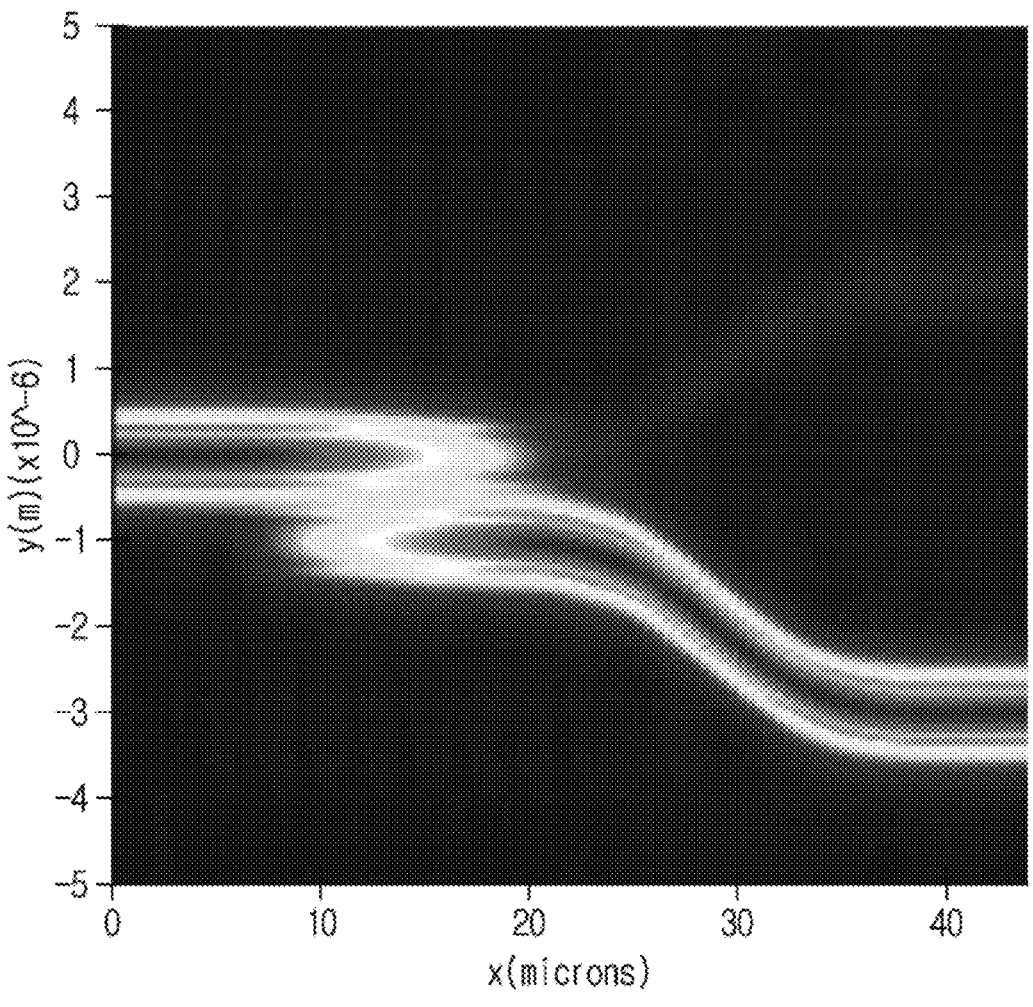
FIG. 1C is a graph showing the intensity of an electric field in the optical signal that passes through the SiN directional coupler.

FIG. 1C is a graph showing the intensity of an electric field in the optical signal that passes through the SiN directional coupler. FIG. 1C shows the intensity of the electric field in the optical signal (for example, in a 0-th mode) that propagates along the SiN optical waveguide when L=14 μm. From FIG. 1C, it can be seen that most of the optical signals that are input accomplish optical coupling to the output port 3. This is consistent with the result in FIG. 1B.

Usually, when the structure of the directional coupler is fixed, it is impossible to change the intensity of the optical signal that accomplishes the optical coupling to the output port 2 and the output port 3. However, when a phase transition material (for example, a material that converts into amorphous-$Ge_2Sb_2Te_5$ (GST) (a-GST) or crystal GST (c-GST)), such as GST, is applied to the above-mentioned SiN directional coupler, the intensity of the optical signal that accomplishes the optical coupling to the output port may vary with a change in refractive index that depends on a crystal structure of the phase transition material.

Figure 2A:
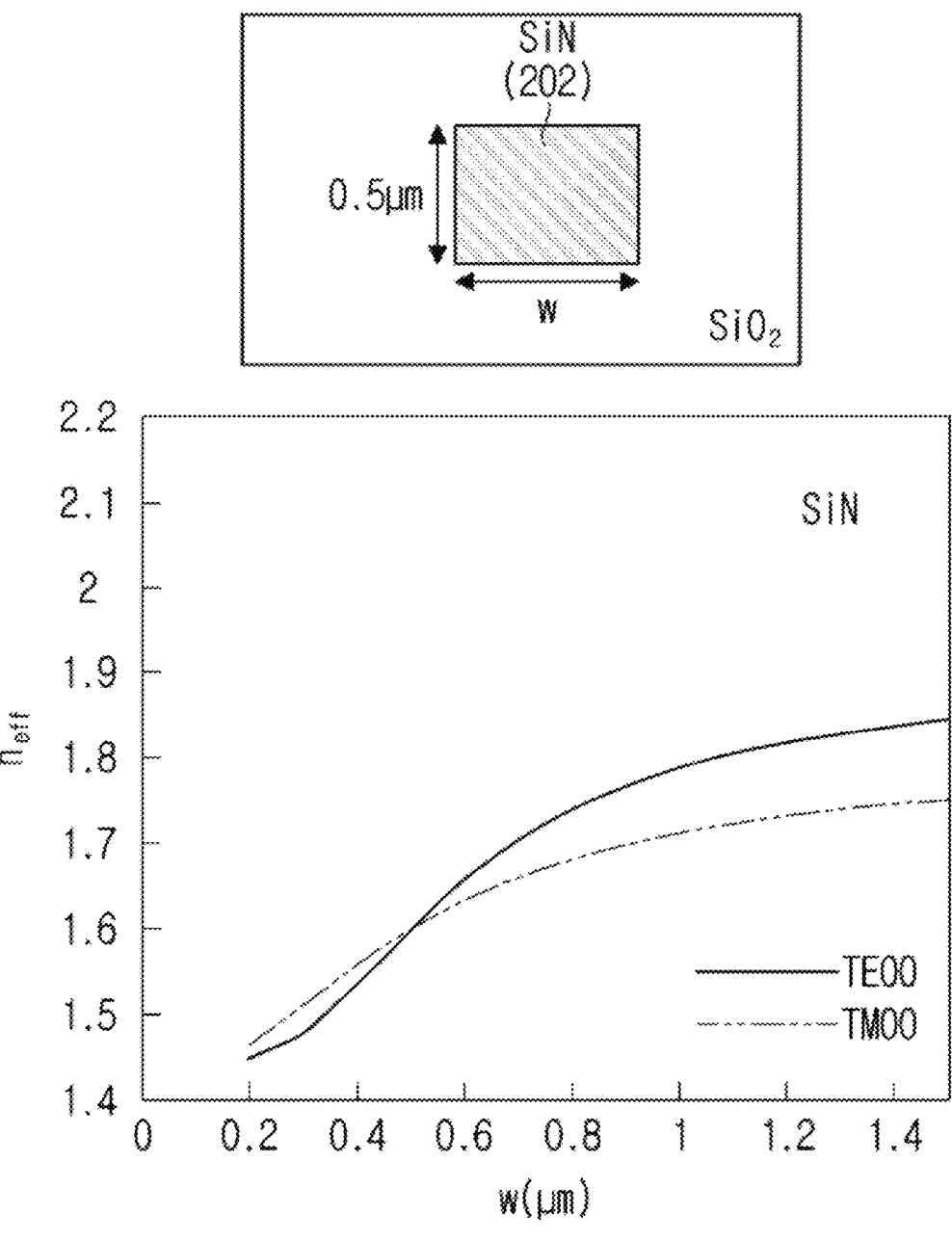
FIG. 2A is a graph showing an effective refractive index that varies with a width of the SiN optical waveguide.
Figure 2B:
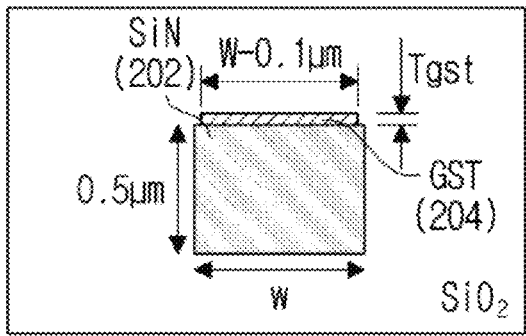
FIG. 2B is a graph showing an effective refractive index that varies with a width of an a-GST/SiN optical waveguide.
Figure 2B:
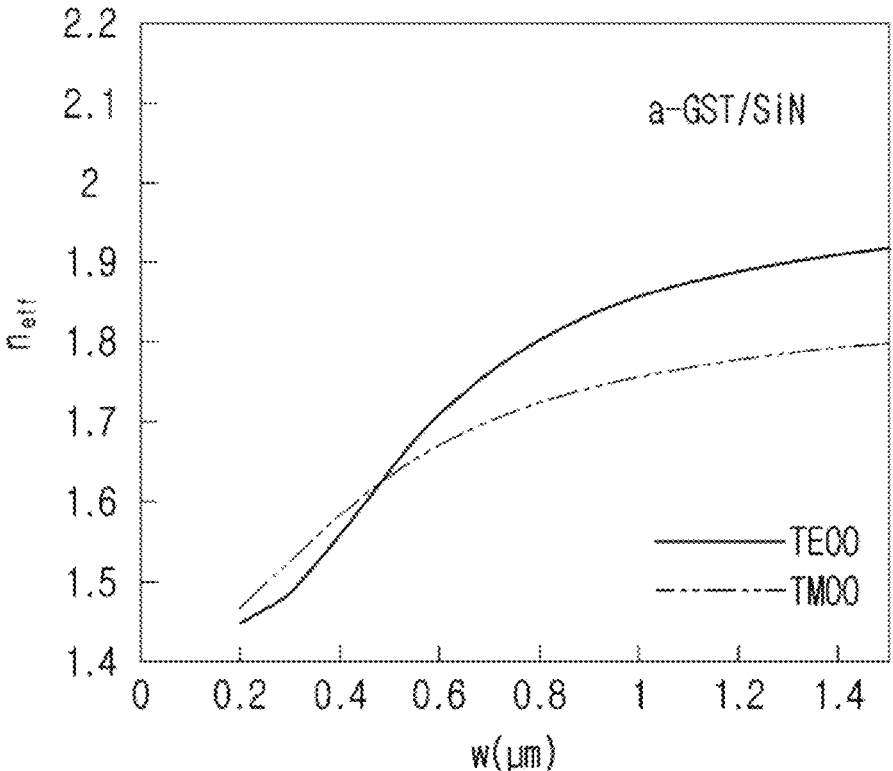
Figure 2C:
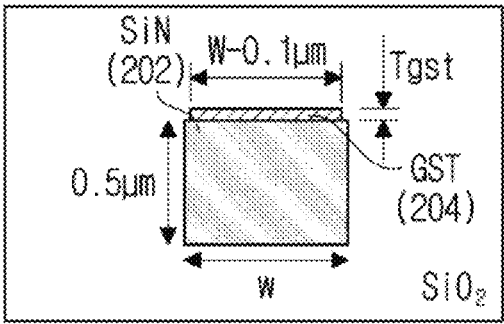
FIG. 2C is a graph showing an effective refractive index that varies with a width of a c-GST/SiN optical waveguide.
Figure 2C:
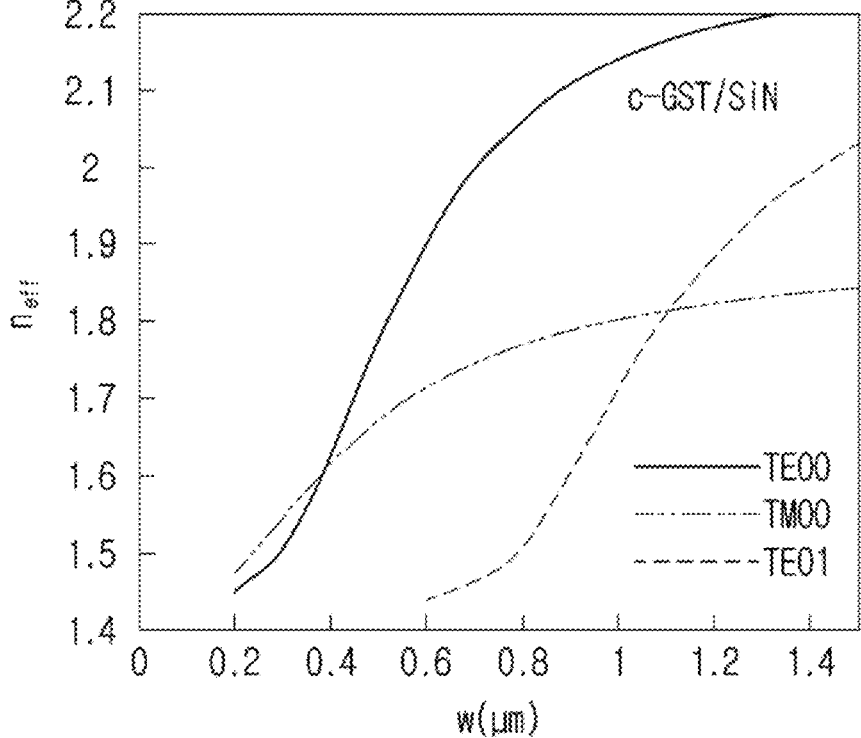

FIGS. 2A to 2C are graphs showing effective refractive indexes $n_{eff}$ that are computed according to varying widths W, respectively, of the SiN optical waveguide, an a-GST/SiN optical waveguide, and a c-GST/SiN optical waveguide, with the thicknesses of the SiN optical waveguide, the a-GST/SiN optical waveguide, and the c-GST/SiN optical waveguide being set to 0.5 μm. FIG. 2A shows a result of the computation of the effective refractive index of the SiN optical waveguide. FIG. 2B shows a result of the computation of the effective refractive index of the a-GST/SiN optical waveguide. FIG. 2C shows a result of the computation of the effective refractive index of the c-GST/SiN optical waveguide. The optical waveguide in FIG. 2 was formed of SiN 202, and the optical waveguides in FIGS. 2B and 2C were formed of SiN 202 and GST 204, respectively. In this case, the GST optical waveguide was designed in such a manner as to have a thickness of 20 nm and a width W of 0.1 μm. From FIGS. 2A to 2C, it can be seen that, at a wavelength of 1.55 μm, the SiN optical waveguide has a refractive index of 2.11, an a-GST optical waveguide has a refractive index of 3.91, and a c-GST optical waveguide has a refractive index of 6.11. There is a significant difference in the refractive index between each of the SiN optical waveguide and a-GST optical waveguide, and the c-GST optical waveguide. As described above, it can be seen that the effective refractive index $n_{eff}$ of the c-GST/SiN optical waveguide is much more increased than those of the SiN optical waveguide and the a-GST/SiN optical waveguide.

Figure 3A:
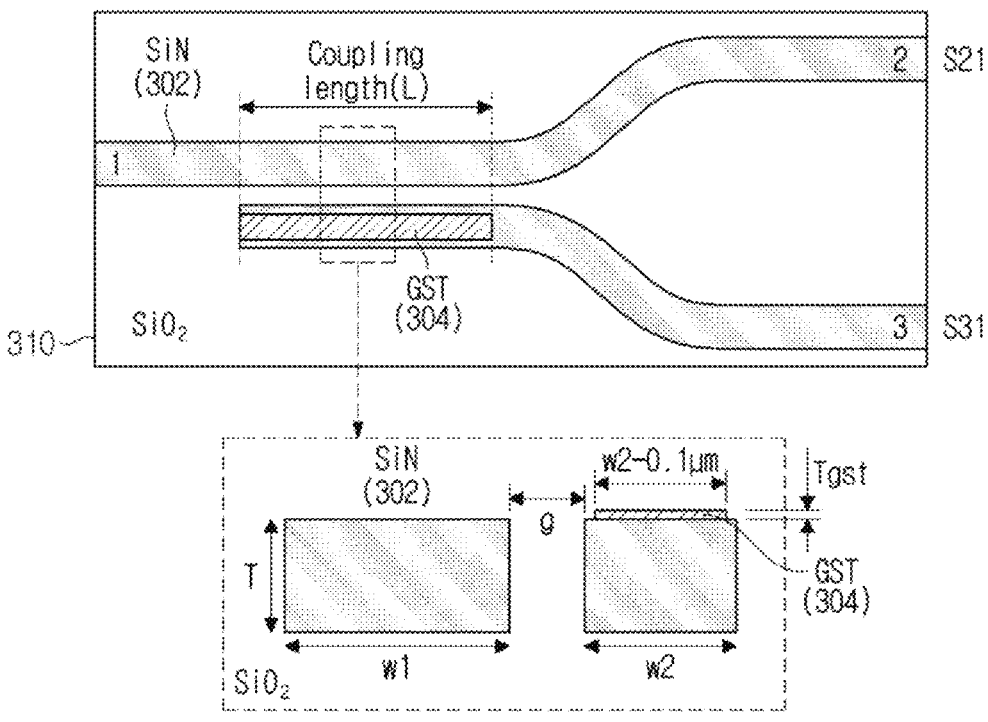
FIG. 3A is a diagram illustrating a structure of an asymmetrical GST/SiN directional coupler according to a first embodiment of the present disclosure.

FIG. 3A is a diagram illustrating a structure of an asymmetrical GST/SiN directional coupler according to a first embodiment of the present disclosure. FIG. 3A illustrates a structure of a photonic switch based on an asymmetrical GST/SiN directional coupler that is configured with two in-parallel optical waveguides, a SiN optical waveguide 302 and a GST optical waveguide 304, that constitute a directional coupler 310. In order to effectively generate evanescent coupling between different optical waveguides, it is desired that two optical waveguides are designed in such a manner that effective refractive indexes thereof are the same.

Figure 3B:
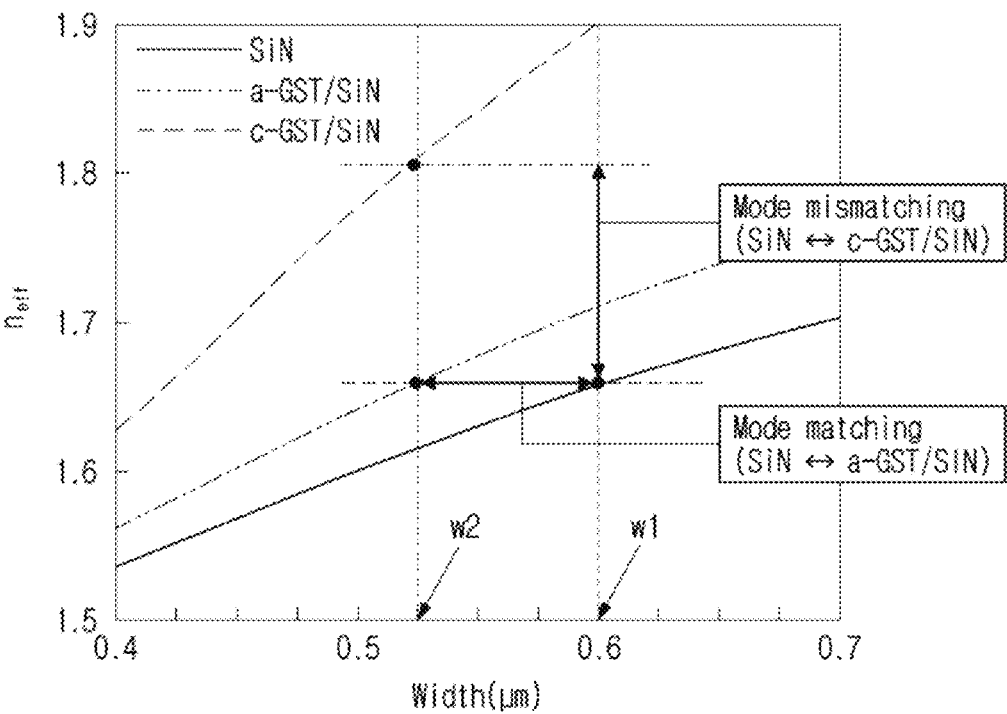
FIG. 3B is a graph showing an effective refractive index that varies with a width of the optical waveguide of the asymmetrical GST/SiN directional coupler according to the first embodiment of the present disclosure.

FIG. 3B is a graph showing an effective refractive index that varies with a width of the optical waveguide of the asymmetrical GST/SiN directional coupler according to the first embodiment of the present disclosure. FIG. 3B is a graph for comparing refractive indexes neff, in mode TE00, of the SiN optical waveguide, the a-GST/SiN optical waveguide, and the c-GST/SiN optical waveguide with each other, on the basis of results in FIGS. 2A to 2C. The SiN optical waveguide and the a-GST/SiN optical waveguide have the same effective refractive index when they have a width w1 of 0.6 μm and a width w2 of 0.525 μm, respectively. At this point, there occurs a difference of approximately 0.15 in the refractive index between the SiN optical waveguide and the c-GST/SiN optical waveguide. The SiN optical waveguide and the a-GST/SiN optical waveguide are matched in mode with each other. Therefore, the optical coupling is effectively accomplished in the directional coupler. However, the SiN optical waveguide and the c-GST/SiN optical waveguide is mode-mismatched with each other. Therefore, the optical coupling is suppressed in the directional coupler. The use of these properties makes it possible to switch the optical signal according to phase transition of GST.

Directional couplers according to various embodiments of the present disclosure, which are formed of a combination of SiN with GST, will be described in more detail below.

Figure 4A:
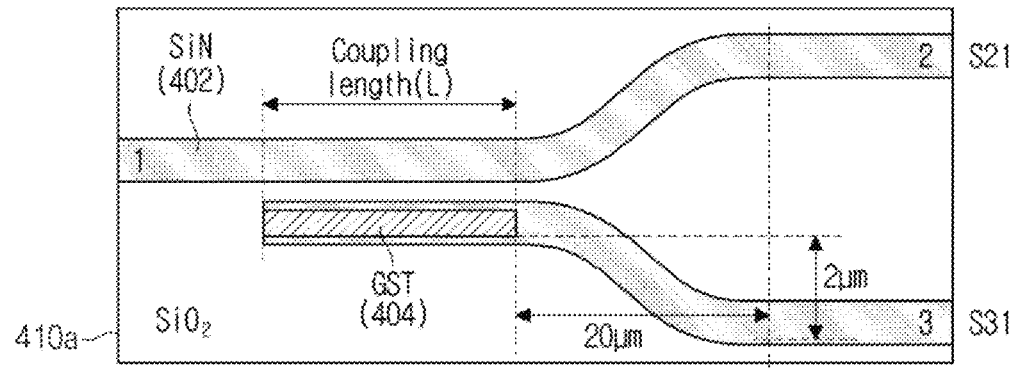
FIG. 4A is a diagram illustrating an implementation example of an asymmetrical GST/SiN directional coupler according to a second embodiment of the present disclosure.

FIG. 4A is a diagram illustrating an implementation example of an asymmetrical GST/SiN directional coupler according to a second embodiment of the present disclosure. With reference to FIG. 4A, a directional coupler 410a includes two optical waveguides. Of these optical waveguides, the optical waveguide positioned above is formed of SiN 402, and the optical waveguide positioned below are formed of SiN 402 and GST 404. In the optical waveguide positioned below, GST 404 is combined with one portion of SiN 402, In an example in FIG. 4A, GST 404 is present in a straight-line section of the optical waveguide positioned below.

The SiN optical waveguide needs to have a radius of curvature of 50 μm or greater in order to obtain optical loss characteristics that are negligible in a curved section. Therefore, a distance between the optical waveguides in a curved optical waveguide section is increased. This increase causes a decrease in extinction ratio (ER) performance of a switching element as the directional coupler. In order to solve this problem, as in an example in FIG. 4B, a photonic switch based on the asymmetrical GST/SiN directional coupler that results from applying GST to the directional coupler and a front portion (for example, up to a portion where a gap between curved optical waveguides is 1 μm or greater) of the curved section, may be considered.

Figure 4B:
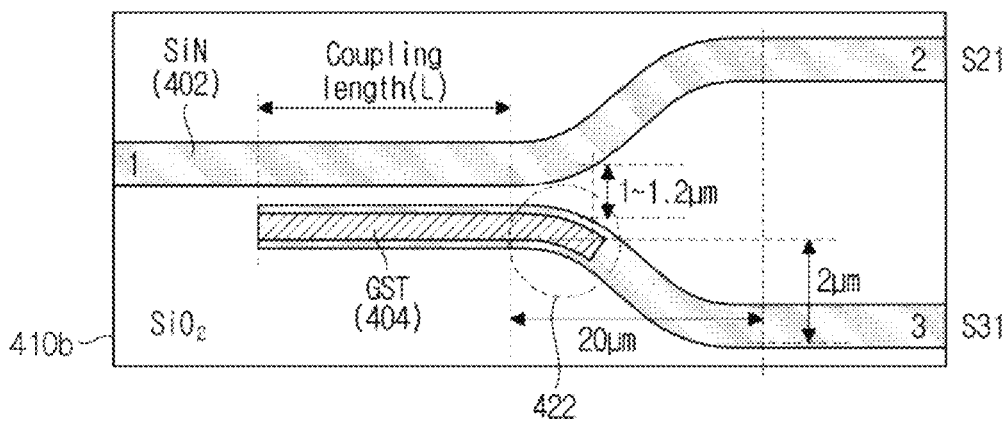
FIG. 4B is a diagram illustrating an implementation example of an asymmetrical GST/SiN directional coupler according to a third embodiment of the present disclosure.

FIG. 4B is a diagram illustrating an implementation example of an asymmetrical GST/SiN directional coupler according to a third embodiment of the present disclosure. With reference to FIG. 4B, a directional coupler 410b includes two optical waveguides. Of these optical waveguides, the optical waveguide positioned above is formed of SiN 402, and the optical waveguide is formed of SiN 402 and GST 404. In the optical waveguide positioned below, GST 404 is combined with one portion of SiN 402. In this case, as opposed to the example in FIG. 4A, GST 404 is also present in a curved section 422 of the optical waveguide positioned below.

As described above, the directional coupler may vary in size according to whether or not GST is applied up to the curved section of the optical waveguide. Results of imitating experiments associated with the examples in FIGS. 4A and 4B are as follows.

FIGS. 5A to 5D show results, respectively, of simulation of the photonic switch that results from GST to only a straight-line section of the directional coupler as in FIG. 4A. FIGS. 6A to 6D show results, respectively, of simulation of the photonic switch that results from applying GST up to the directional coupler and the front portion of the curved section as in FIG. 4B.

Figure 5A:
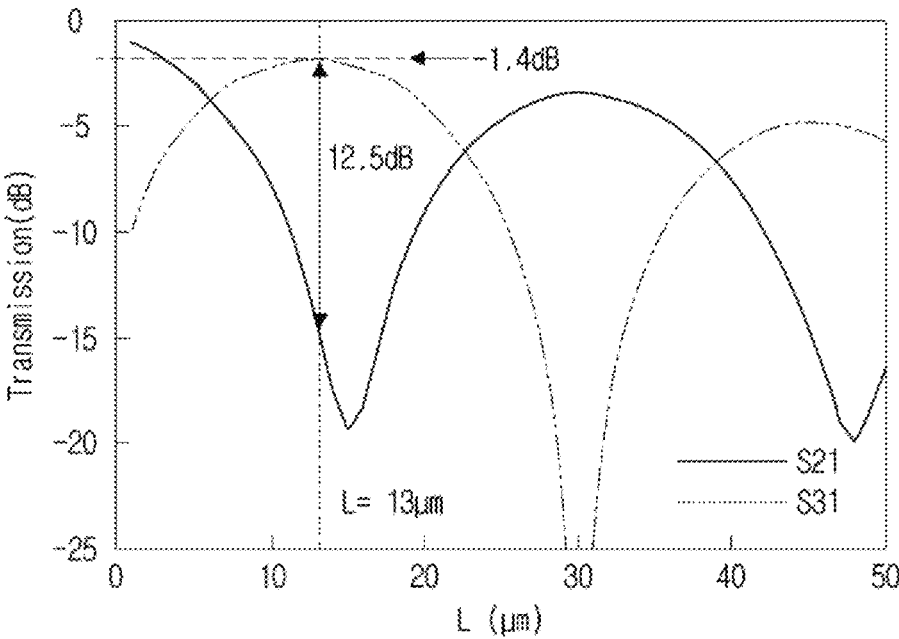
FIG. 5A is a graph showing the intensity of the optical signal that is output in an a-GST state of the asymmetrical GST/SiN directional coupler according to the second embodiment of the present disclosure.

FIG. 5A is a graph showing the intensity of the optical signal that is output in an a-GST state of the asymmetrical GST/SiN directional coupler according to the second embodiment of the present disclosure. FIG. 5A shows a result of computation of the intensity of the optical signal at the output port 2 and the output port 3 that varies with the coupling length L in an a-GST state. The optical signal flows from the SiN optical waveguide to the a-GST/SiN optical waveguide due to the evanescent coupling that depends on the coupling length L and flows from the a-GST/SiN optical waveguide back to the SiN optical waveguide and propagates along the directional coupler When L=13 μm, most of the optical signals accomplish optical coupling from the SiN optical waveguide to the a-GST/SiN optical waveguide. At this point, a loss was 1.4 dB, and an ER was 12.5 dB.

Figure 5B:
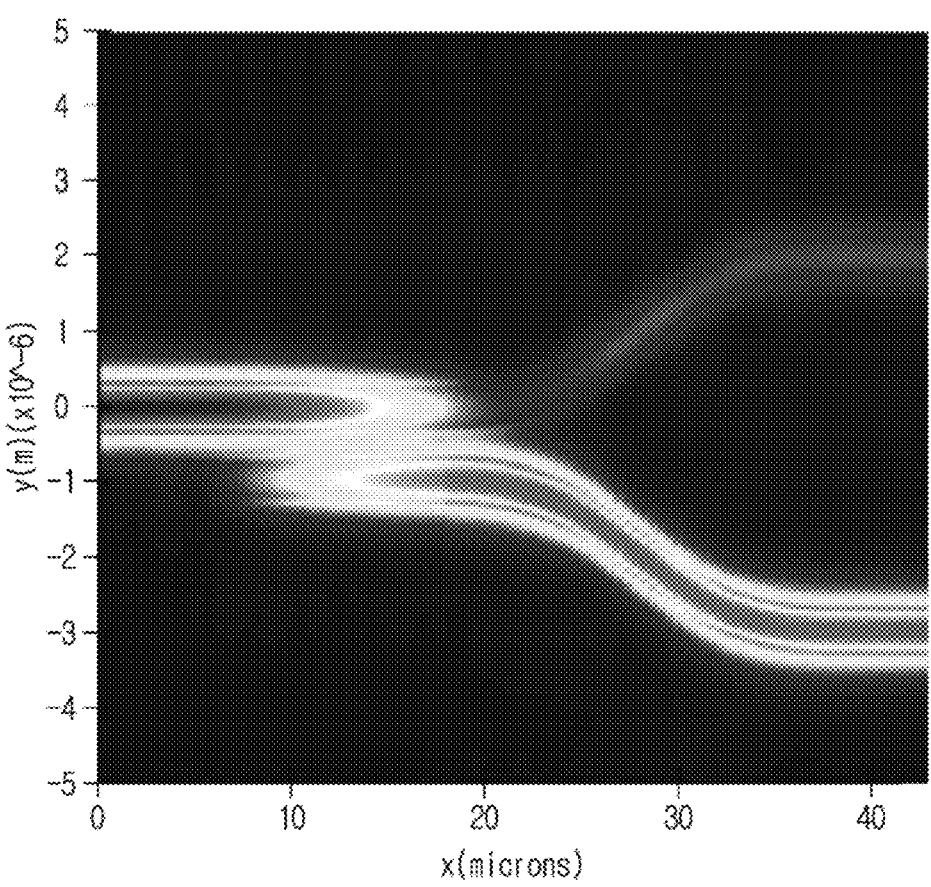
FIG. 5B is a graph showing the intensity of the electric field of the optical signal that is output in the a-GST state of the asymmetrical GST/SiN directional coupler according to the second embodiment of the present disclosure.

FIG. 5B is a graph showing the intensity of the electric field of the optical signal that is output in the a-GST state of the asymmetrical GST/SiN directional coupler according to the second embodiment of the present disclosure. FIG. 5B shows the intensity of the electric field of the optical signal (in a 0-th TE mode) that propagates along the directional coupler when L=13 μm in the a-GST state. From 5B, it can be seen that most of the optical signals flow from the SiN optical waveguide to the a-GST/SiN optical waveguide and then accomplish the optical coupling to the outport 3.

Figure 5C:
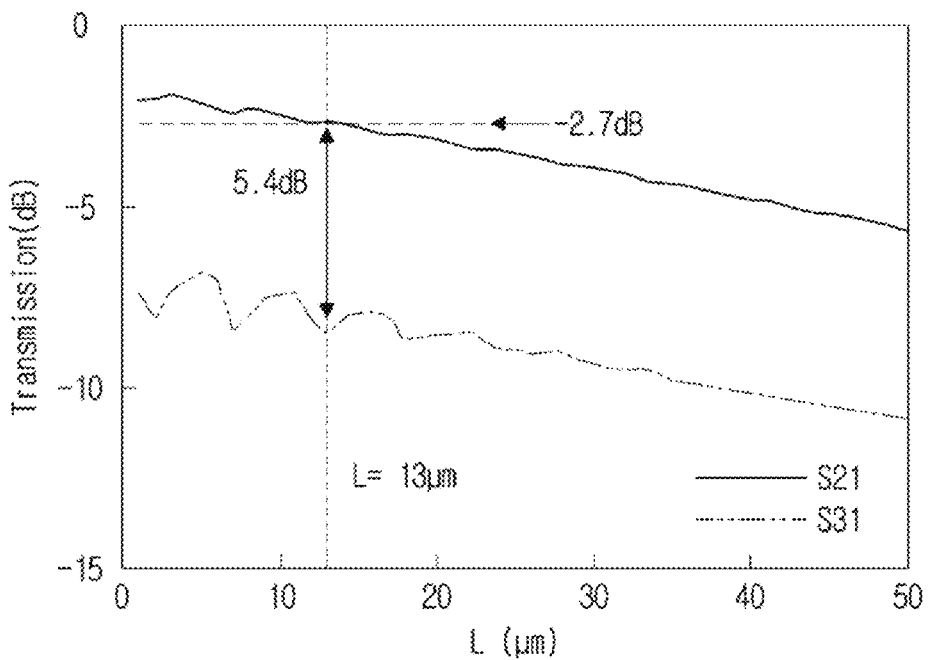
FIG. 5C is a graph showing the intensity of the optical signal that is output in a c-GST state of the asymmetrical GST/SiN directional coupler according to the second embodiment of the present disclosure.

FIG. 5C is a graph showing the intensity of the optical signal that is output in a c-GST state of the asymmetrical GST/SiN directional coupler according to the second embodiment of the present disclosure. FIG. 5C shows a result of computation of the intensity of the optical signal at the output port 2 and the output port 3 in the c-GST state. From FIG. 5C, it can be seen that when L=13 μm, a loss is 2.7 dB and an ER is 5.4 dB. The loss and the ER in the c-GST state are smaller than those in the a-GST state.

Figure 5D:
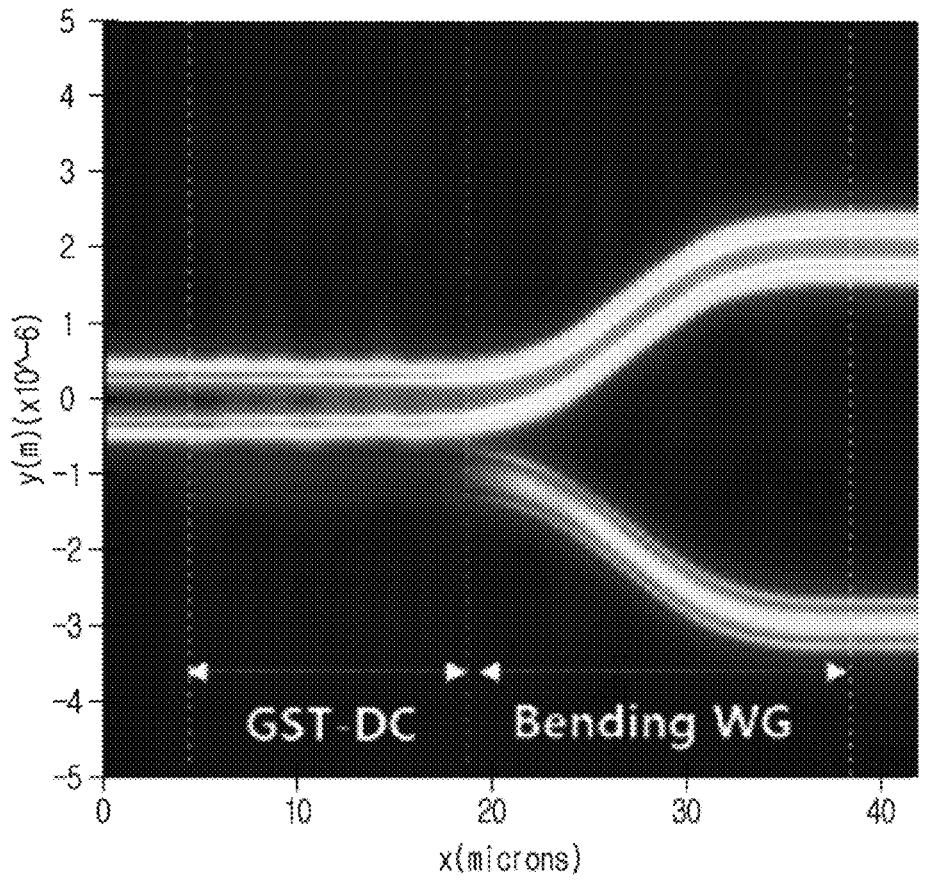
FIG. 5D is a graph showing the intensity of the electric field of the optical signal in the c-GST state of the asymmetrical GST/SiN directional coupler according to the second embodiment of the present disclosure.

FIG. 5D is a graph showing the intensity of the electric field of the optical signal in the c-GST state of the asymmetrical GST/SiN directional coupler according to the second embodiment of the present disclosure. FIG. 5D shows the intensity of the electric field of the optical signal (in the 0-th TE mode) that propagates along the directional coupler when L=13 μm in the c-GST state. From FIG. 5D, it can be seen that the optical signal is suppressed from accomplishing the optical coupling to the c-GST/SiN optical waveguide in a directional coupler region due to the mode mismatching, but accomplishes the optical coupling in the curved section. Due to the optical coupling in the curved optical waveguide section, in the c-GST state, a loss in the directional coupler is increased, and an ER is decreased.

Figure 6A:
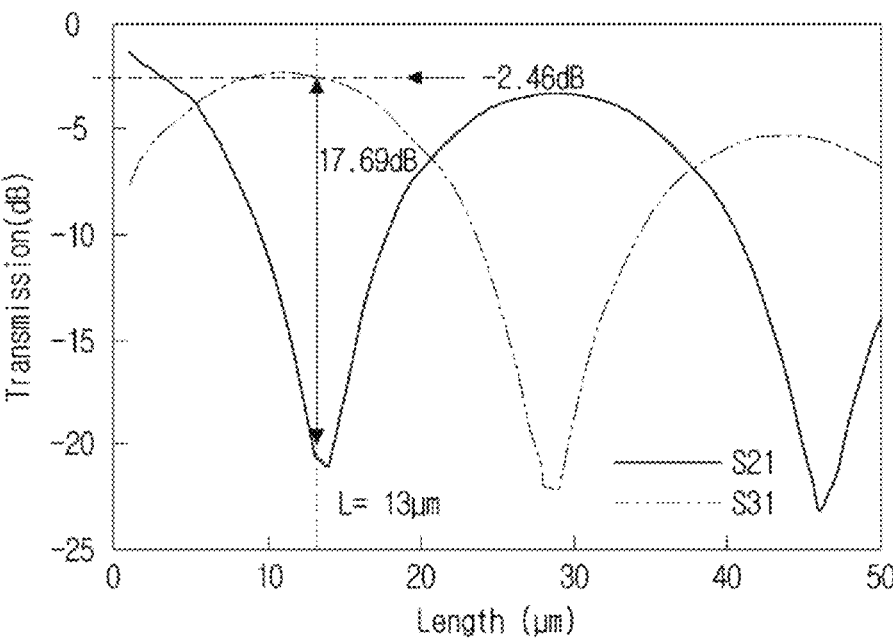
FIG. 6A is a graph showing the intensity of the optical signal that is output in the a-GST state of the asymmetrical GST/SiN directional coupler according to the third embodiment of the present disclosure.

FIG. 6A is a graph showing the intensity of the optical signal that is output in the a-GST state of the asymmetrical GST/SiN directional coupler according to the third embodiment of the present disclosure. FIG. 6A shows a result of computation of the intensity of the optical signal at the output port 2 and the output port 3 that varies with the coupling length L in the a-GST state. From FIG. 6A, it can be seen that when L=13 μm, most of the signals accomplish the optical coupling from the SiN optical waveguide to the a-GST/SiN optical waveguide. At this time, a loss was 2.46 dB, and ER was 17.69 dB.

Figure 6B:
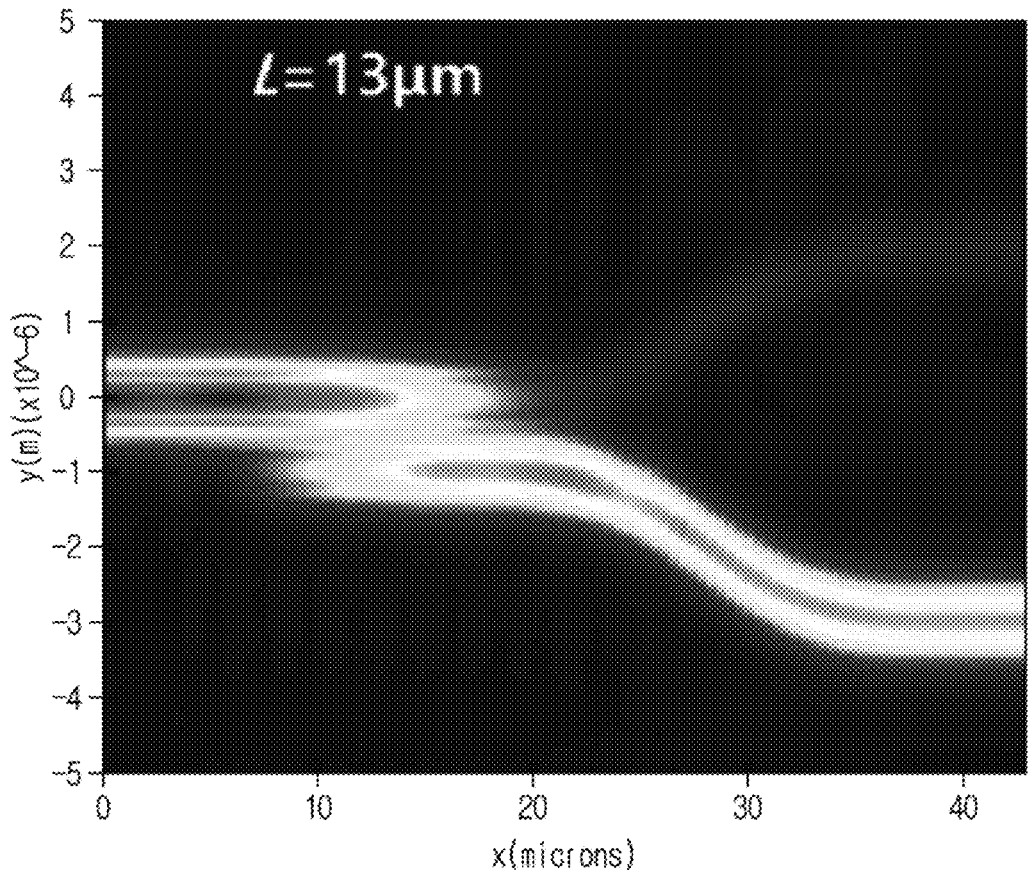
FIG. 6B is a graph showing the intensity of the electric field of the optical signal in the a-GST of the asymmetrical GST/SiN directional coupler according to the third embodiment of the present disclosure.

FIG. 6B is a graph showing the intensity of the electric field of the optical signal in the a-GST of the asymmetrical GST/SiN directional coupler according to the third embodiment of the present disclosure. FIG. 6B shows the intensity of the electric field of the optical signal (in the 0-th TE mode) that propagates along the directional coupler when L=13 μm in the a-GST state. From FIG. 6B, it can be seen that most of the optical signal flows from the SiN optical waveguide to the a-GST/SiN optical waveguide and then accomplishes the optical coupling to the output port 3.

Figure 6C:
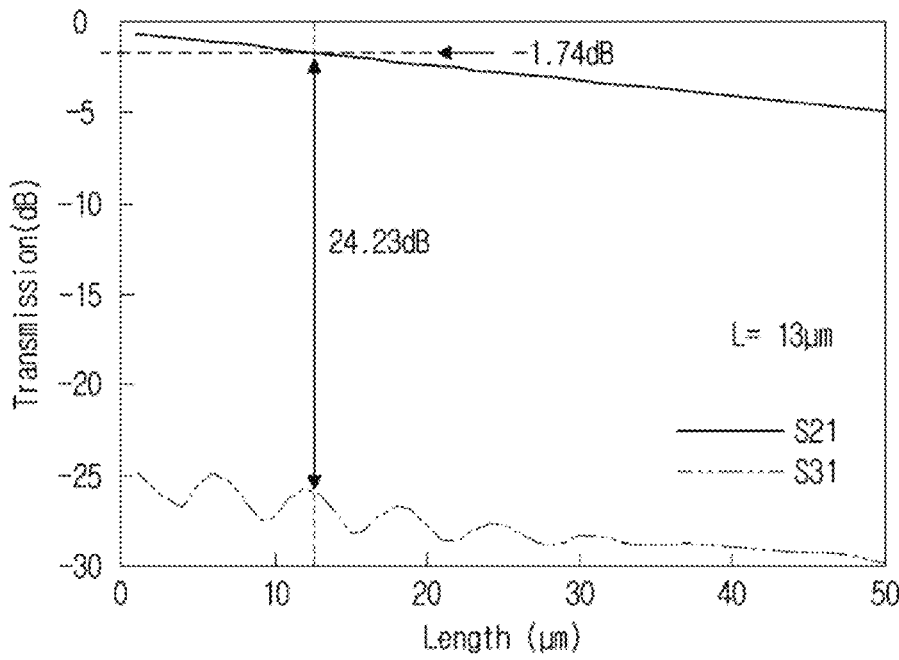
FIG. 6C shows the intensity of the optical signal that is output in the c-GST of the asymmetrical GST/SiN directional coupler according to the third embodiment of the present disclosure.

FIG. 6C is a graph showing the intensity of the optical signal that is output in the c-GST state of the asymmetrical GST/SiN directional coupler according to the third embodiment of the present disclosure. FIG. 6C shows a result of computation of the intensity of the optical signal at the output port 2 and the output port 3 that varies with the coupling length L in the c-GST state. From FIG. 6C, it can be seen that, when L=13 μm, a loss is at a high value of 1.74 dB and an ER is at a high value of 24.23 dB.

Figure 6D:
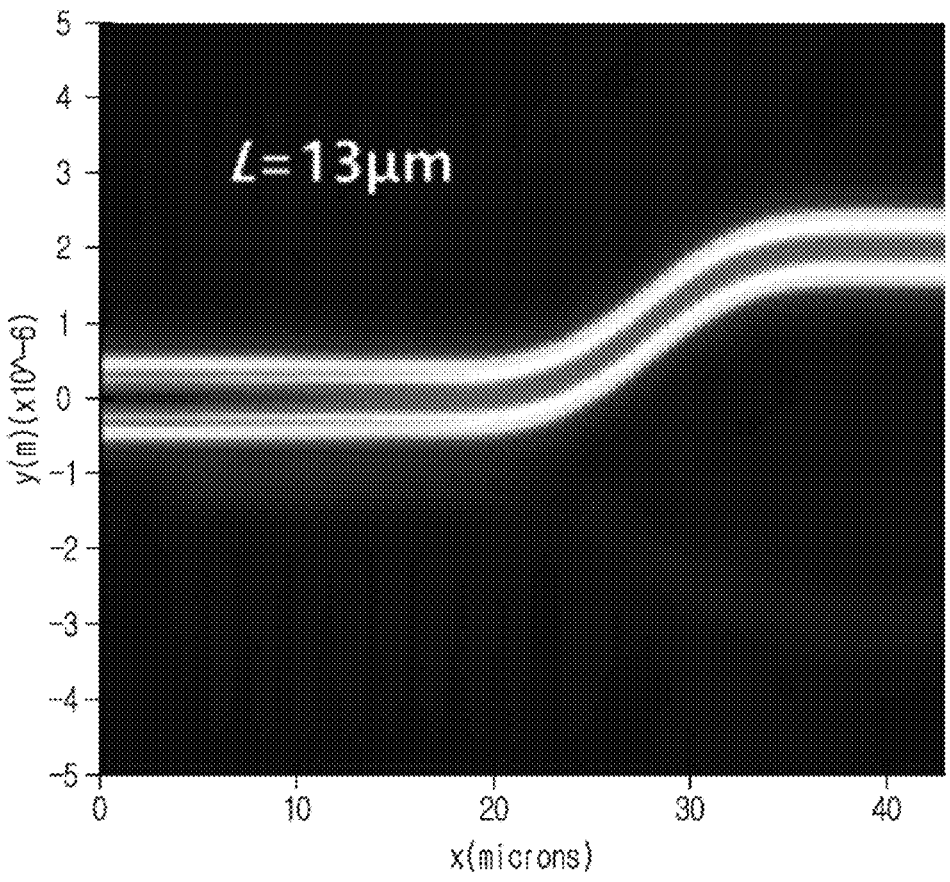
FIG. 6D is a graph showing the intensity of the electric field of the optical signal in the c-GST state of the asymmetrical GST/SiN directional coupler according to the third embodiment of the present disclosure.

FIG. 6D is a graph showing the intensity of the electric field of the optical signal in the c-GST state of the asymmetrical GST/SiN directional coupler according to the third embodiment of the present disclosure. FIG. 6D shows the intensity of the electric field of the optical signal (in the 0-th TE mode) that propagates along the directional coupler when L=13 μm in the c-GST state. From FIG. 6D, it can be seen that, due to the mode mismatching, the optical signal is remarkably suppressed from accomplishing the optical coupling to the c-GST/SiN optical waveguide in the curves section, as well as in the directional coupler region.

Figure 7A:
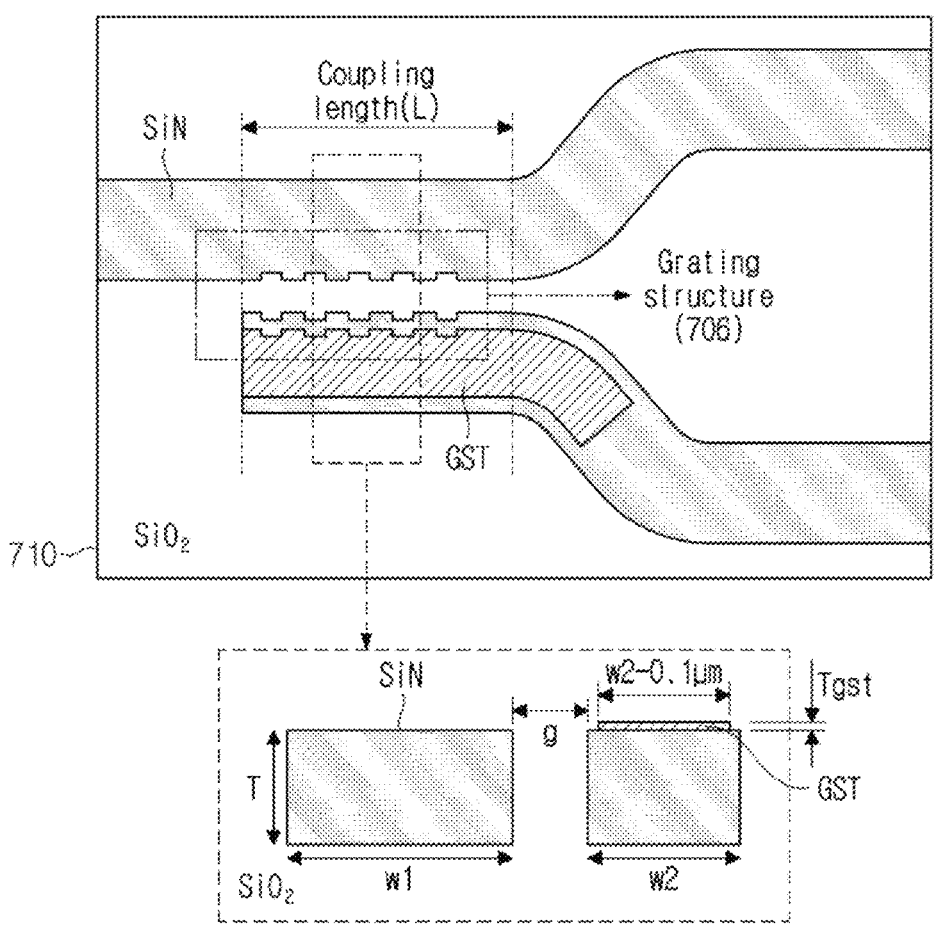
FIG. 7A is a diagram illustrating an implementation example of an asymmetrical GST/SiN directional coupler according to a fourth embodiment of the present disclosure.

FIG. 7A is a diagram illustrating an implementation example of an asymmetrical GST/SiN directional coupler according to a fourth embodiment of the present disclosure. With reference to FIG. 7A, a sub-wavelength grating (SWG) structure 706 may be employed as a structure of a photonic switch based on an asymmetrical GST/SiN directional coupler 710. The SWG structure 706 is formed in lateral surfaces, facing each other, of the parallelly arranged SiN and GST/SiN optical waveguides that constitute the asymmetrical GST/SiN directional coupler 710. Accordingly, the coupling length L may be further shortened.

Figure 7B:
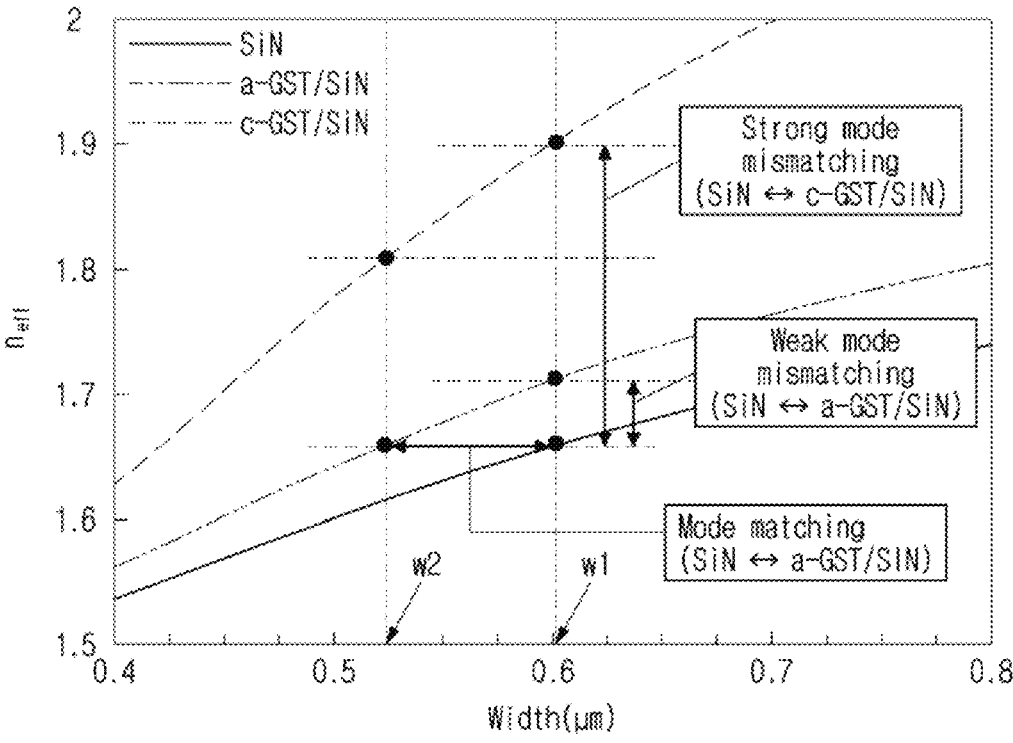
FIG. 7B is a graph showing an effective refractive index that varies with a width of the optical waveguide of the asymmetrical GST/SiN directional coupler according to the fourth embodiment of the present disclosure.

FIG. 7B is a graph showing an effective refractive index that varies with a width of the optical waveguide of the asymmetrical GST/SiN directional coupler according to the fourth embodiment of the present disclosure. FIG. 7B shows effective refractive indexes of the SiN, a-GST/SiN, and c-GST/SiN optical waveguides that vary with their widths. From FIG. 7B, it can be seen that, when the conditions, the widths w1 and w2, are controlled, the effective refractive indexes of the SiN optical waveguide and the GST/SiN optical waveguide may become the same or vary according to GST phase transition.

In the case of a general photonic switch based on a mode-matched GST/SiN directional coupler to which a mode matching condition applies, the widths (for example, w1=0.6 μm, and w2=0.525 μm) of the optical waveguides are selected in such a manner that the SiN and a-GST/SiN optical waveguides have the same effective refractive index. At this point, there occurs a difference of 0.15 in the effective refractive index between the SiN and c-GST/SiN optical waveguides, thereby causing the mode mismatching. Because of this, switching characteristic appears in a manner that varies with a crystal structure of GST. At this point, the SWG structure applies to the photonic switch based on the GST/SiN directional coupler, and thus, the coupling length may be further shortened. The reason when the coupling length is shortened is because the evanescent field coupling is enhanced due to SGW-caused diffraction. However, due to the effect of strong SWG-caused optical coupling, a function of suppressing the optical coupling resulting from the mode mismatching in the c-GST state may be diminished. Table 1 shows a result of performing simulation on SWG GST/SiN DC PS 1 and SWG GST/SiN DC PS 2

SWG to identify an element in which application of SWG shortens the coupling length and in which the switching characteristic appears in a manner that varies with a GST state. Table 1 shows $\Delta n_{eff}$ that varies the widths w1 and w2 of the SiN and GST/SiN optical waveguides in three types of photonic switches that constitute the directional couplers, respectively.

TABLE 1

| Device | SWG | Width of SiN optical waveguide | | $\Delta n_{eff}$ | |
| | | w1[μm] | w2[μm] | SiN↔a-GST/SiN | SiN↔c-GST/SiN |
| --- | --- | --- | --- | --- | --- |
| GST/SiN DC PS | x | 0.6 | 0.525 | 0 (mode matching) | 0.15 (mode mismatching) |
| SWG GST/SiN DC PS1 | o | 0.6 | 0.525 | 0 (mode matching) | 0.15 (mode mismatching) |
| SWG GST/SiN DC PS2 | o | 0.6 | 0.6 | 0.05 (weak mode mismatching) | 0.19 (strong mode mismatching) |

In Table 1, SWG GST/SiN DC PS 1 has a structure in which the widths (w1=0.6 μm and w2=0.525 μm) of the optical waveguides are selected in such a manner that the SiN and a-GST/SiN optical waveguides have the same effective refractive index (are mode-matched. Moreover, SWG GST/SiN DC PS 2 has a structure in which the widths (w1=0.6 μm and w2=0.6 μm) of the optical waveguides are selected in such a manner that there occurs a difference of 0.05 (weak mode mismatching) in the effective refractive index between the SiN and a-GST/SiN optical waveguides and that occurs a difference of 0.19 (strong mode mismatching) in the effective refractive index between the SiN and c-GST/SiN optical waveguides.

Figure 8A:
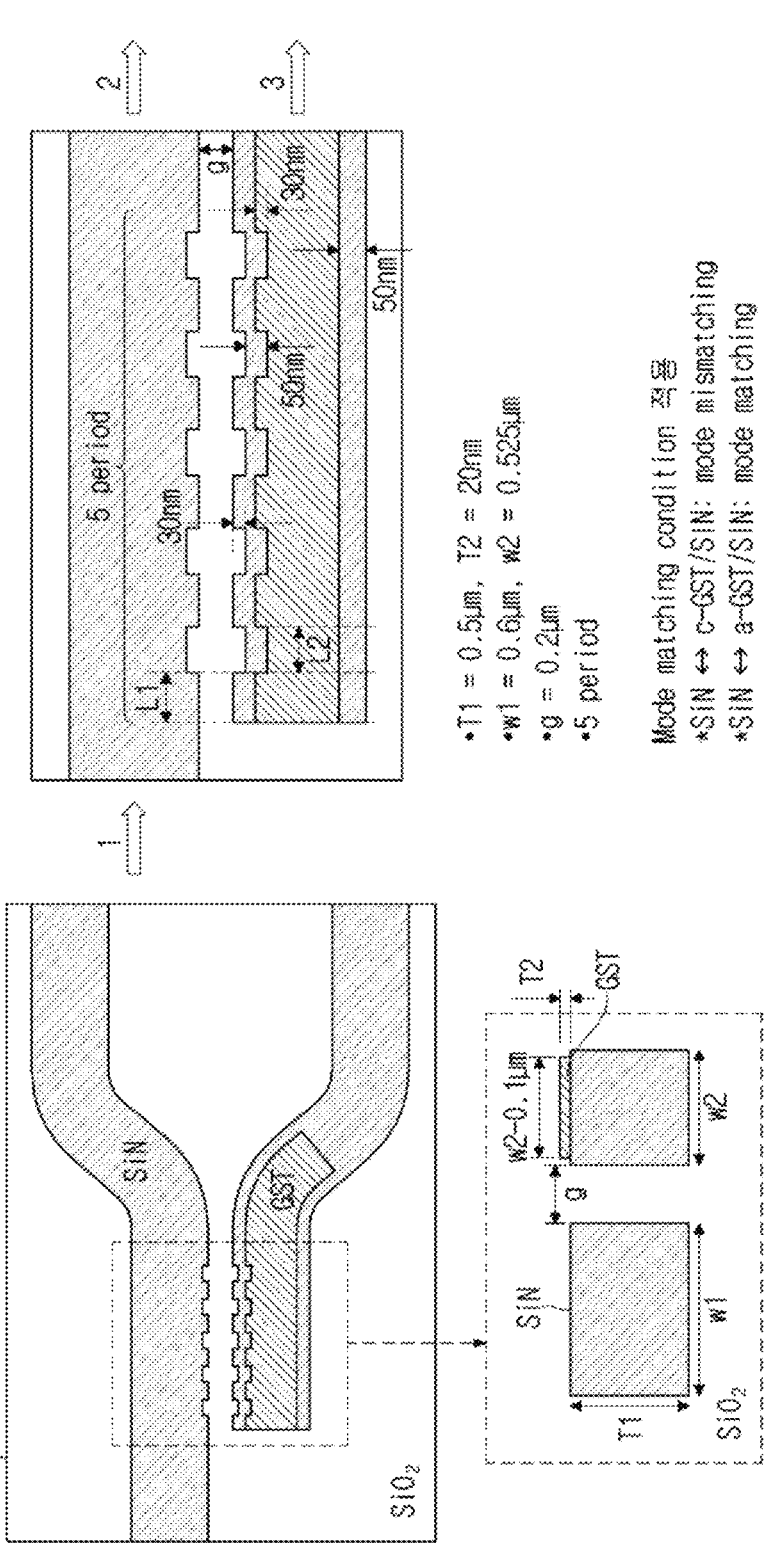
FIG. 8A is a diagram showing an implementation example of an asymmetrical GST/SiN directional coupler according to a fifth embodiment of the present disclosure to which a mode matching condition applies.

FIG. 8A is a diagram showing an implementation example of an asymmetrical GST/SiN directional coupler according to a fifth embodiment of the present disclosure to which a mode matching condition applies. FIG. 8A shows a photonic switch based on an SWG GST/SiN directional coupler to which the mode matching condition applies. The SiN optical waveguide and the a-GST/SiN optical waveguides were designed in such a manner as to have the width w1=0.6 μm and the width w2=0.525 μm, respectively, in order to satisfy the mode matching conditions for the SiN optical waveguide and the a-GST/SiN optical waveguides. A grating period is 0.75 μm (L1=0.25 μm and L2=0.5 μm). This grating period is a condition for maximizing S31 (the intensity of light that propagates from input 1 from input 3).

Figure 8B:
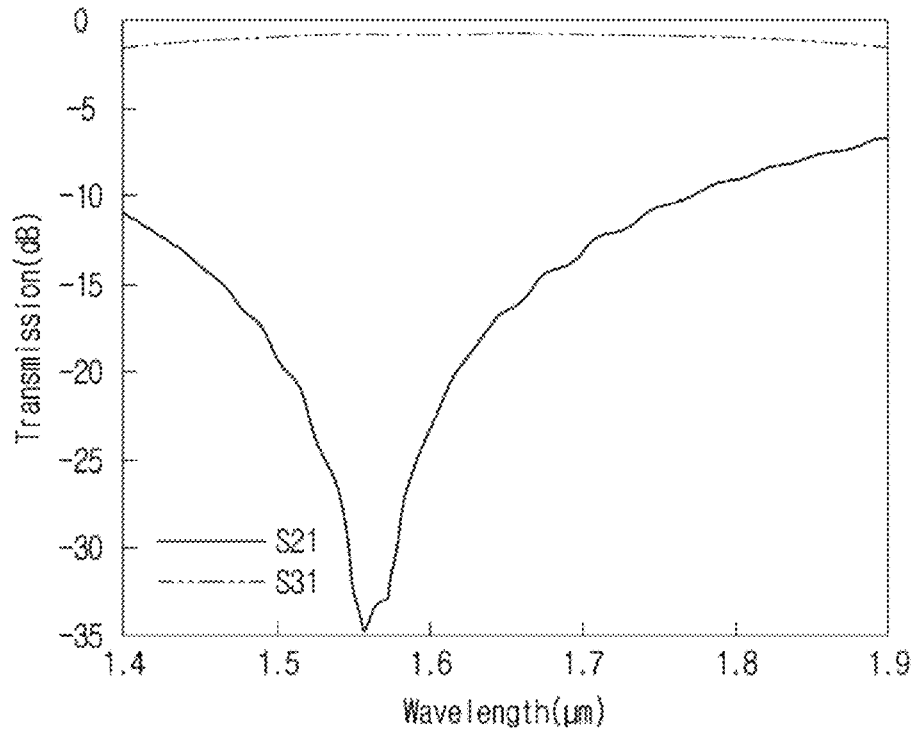
FIG. 8B is a diagram showing a transmission spectrum in the a-GST state of the asymmetrical GST/SiN directional coupler according to the fifth embodiment of the present disclosure to which the mode matching condition applies.
Figure 8C:
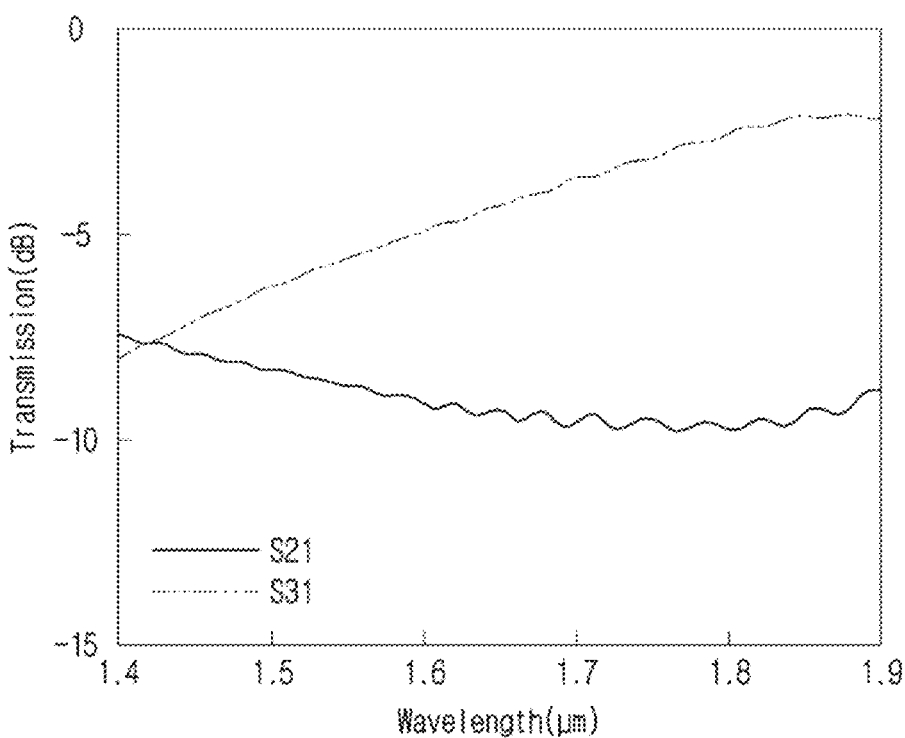
FIG. 8C is a diagram showing a transmission spectrum in the c-GST state of the asymmetrical GST/SiN directional coupler according to the fifth embodiment of the present disclosure to which the mode matching condition applies.

FIG. 8B is a graph showing transmission spectrum in the a-GST state of the asymmetrical GST/SiN directional coupler according to the fifth embodiment of the present disclosure to which the mode matching condition applies. FIG. 8C is a graph showing transmission spectrum in the c-GST state of the asymmetrical GST/SiN directional coupler according to the fifth embodiment of the present disclosure to which the mode matching condition applies. FIG. 8B shows that in the a-GST state, the optical signal accomplishes the optical coupling from the input port 1 to the output port 3 with a low loss and at a high ER. FIG. 8C shows that in the c-GST state, most of the optical signals still accomplish the optical coupling to the output port 3, rather than flowing to the output port 2. From FIGS. 8B and 8C, it can be seen that the characteristic of switching the optical signal according to the GST phase transition does not appear in the photonic switch based on the SWG GST/SiN directional coupler to which the mode matching condition applies.

Figure 9A:
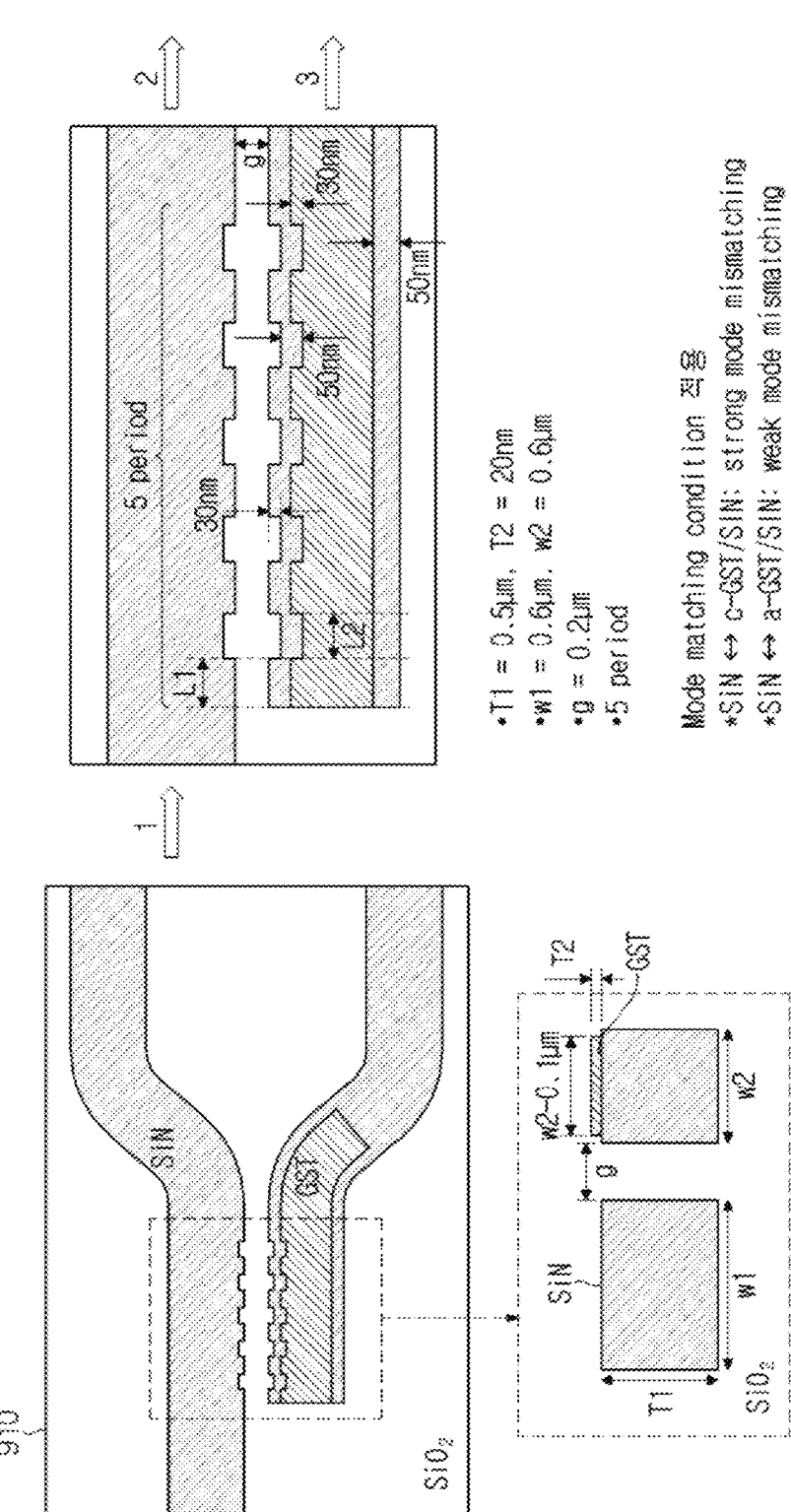
FIG. 9A is a diagram illustrating an implementation example of an asymmetrical GST/SiN directional coupler according to a sixth embodiment of the present disclosure to which a mode mismatching condition applies.

FIG. 9A is a diagram illustrating an implementation example of an asymmetrical GST/SiN directional coupler according to a sixth embodiment of the present disclosure to which a mode mismatching condition applies. FIG. 9A shows a photonic switch based on an SWG GST/SiN directional coupler to which the mode mismatching condition applies. The SiN optical waveguide and the a-GST/SiN optical waveguide were designed in such a manner as to have the width w1=0.6 μm and the width w2=0.6 μm, respectively, in order to satisfy the mode mismatching condition for the SiN optical waveguide and the a-GST/SiN optical waveguide In this case, there occurs a difference of $\Delta n_{eff}$=0.05 (weak mode mismatching) in the effective refractive index between the SiN optical waveguide and the a-GST/SiN optical waveguide, and there occurs a difference of $\Delta n_{eff}$=0.19 (strong mode mismatching) in the effective refractive index between the SiN optical waveguide and the c-GST/SiN optical waveguide.

Figure 9B:
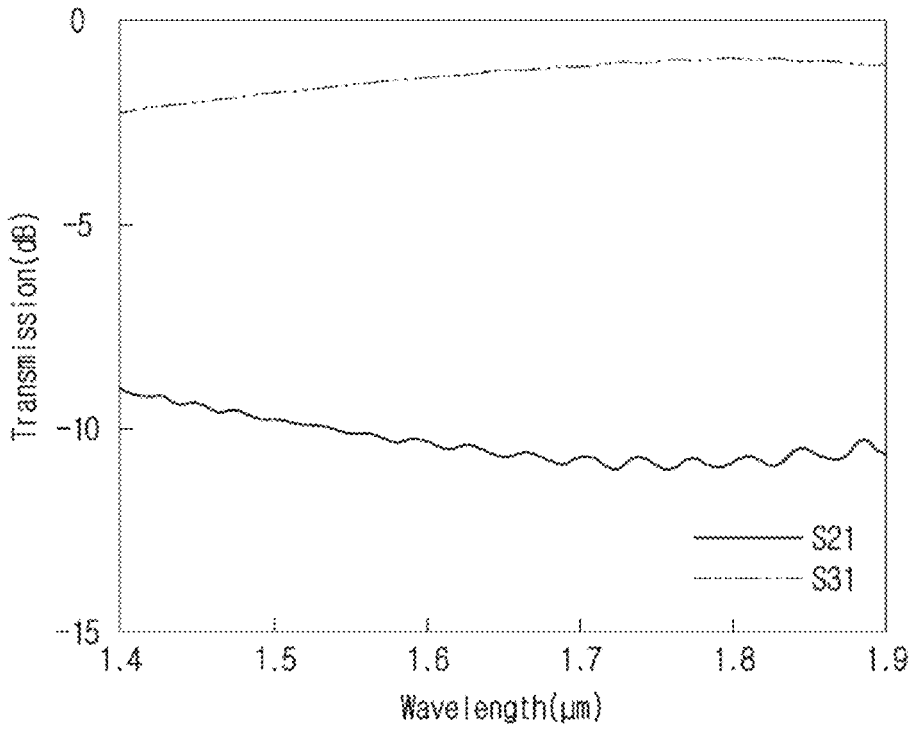
FIG. 9B is a graph showing a transmission spectrum in the a-GST state of the asymmetrical GST/SiN directional coupler according to the sixth embodiment of the present disclosure to which the mode mismatching condition applies.
Figure 9C:
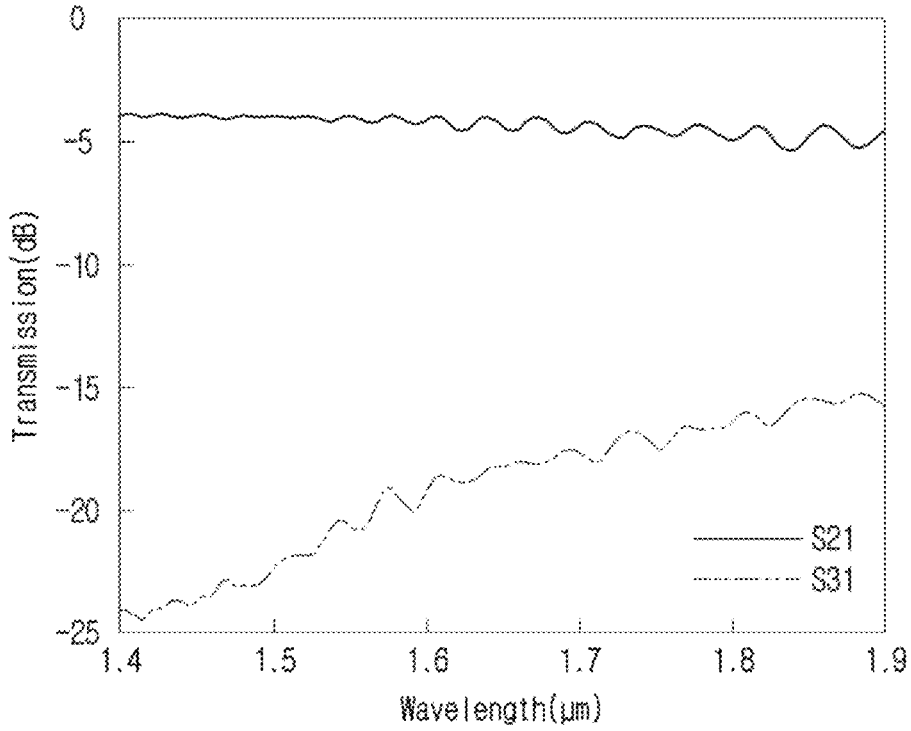
FIG. 9C is a graph showing a transmission spectrum in the c-GST state of the asymmetrical GST/SiN directional coupler according to the sixth embodiment of the present disclosure to which the mode mismatching condition applies.

FIG. 9B is a graph showing a transmission spectrum in the a-GST state of the asymmetrical GST/SiN directional coupler according to the sixth embodiment of the present disclosure to which the mode mismatching condition applies. FIG. 9c is a graph showing a transmission spectrum in the c-GST state of the asymmetrical GST/SiN directional coupler according to the sixth embodiment of the present disclosure to which the mode mismatching condition applies. FIG. 9B shows that in the a-GST state, the optical signal accomplishes the optical coupling from the input port 1 to the output port 3 with a low loss and at an ER of 10 dB or more. From FIG. 9C, it can be seen that in the c-GST, most of the optical signals accomplish the optical coupling to the output port 2. From FIG. 9C, it can be seen that, although the mode missing condition applies, the optical signal is well switched from the input port 1 to the output port 3 in the a-GST state, and from the input port 1 to the output port 2 in the c-GST state. This result means that, the SiN optical waveguide and the a-GST/SiN optical waveguide are under weak mode mismatching ($\Delta n_{eff}$=0.05), the optical signal well accomplishes the optical coupling because the evanescent field coupling is enhanced at the directional coupler due to the SWG-caused diffraction. In contrast, due to the SWG-enhanced evanescent field coupling, the optical signal is difficult to switch under the mode mismatching in the c-GST state. However, because the mode mismatching condition ($\Delta n_{eff}$=0.19) between the SiN optical waveguide and the a-GST/SiN optical waveguide is tightened, it is possible that the SWG-enhanced evanescent field coupling is overcome and that the switching characteristic appears.

As in the various embodiments described above, a grating structure may be formed in lateral surfaces, facing each other, of the optical waveguides in a photonic switching element that includes two optical waveguides. In this case, a metamaterial that experiences phase transition according to temperature is coupled to one optical waveguide, and thus, the output port for the optical signal may vary according to a state of the metamaterial. For example, in a case where, of two output ports, the optical signal needs to be output to an output port positioned at the same optical waveguide as the input port, evanescent coupling has to be suppressed, and therefore, the metamaterial has to be controlled in such a manner as to be in a crystal state. Alternatively, in a case where, of the two output ports, the optical signal needs to be output to an output port positioned at the optical waveguide that does not include the input port, the evanescent coupling has to be accomplished, and therefore, the metamaterial has to be controlled in such a manner as to be in an amorphous state. State control of the metamaterial may be performed by controlling a means of determining a switching path.

As described above, the present disclosure proposes the directional coupler that reflects the result of performing simulation to design the photonic switching element made of the metamaterial and to set up an optimized condition. In the present disclosure, the structure for suppressing the optical coupling that is accomplished at the curved section that follows the directional couple was proposed. [It is checked]) that the performance of the element is improved through the structure proposed on the basis of the result of the simulation on the photonic switch based on the asymmetrical directional coupler including the SiN optical waveguide and the GST/SiN optical waveguide. The photonic switch based on the GST/SiN directional coupler that employs the SWG structure may be used to decrease the size of the element much more. Through the simulation, it is checked that the size of the element of the photonic switch is decreased in the proposed structure.

When the radius of curvature is as small as approximately ~5 μm as is the case with the Si optical waveguide, a gap between the output ports of the directional coupler is steeply increased. Accordingly, crosstalk due to the optical coupling between the optical waveguides is decreased, and thus the ER is increased. However, when the radius of curvature is equal to or greater than 50 μm as is the case with the SiN optical waveguide, the gap between the output ports of the directional coupler is gently increased. Accordingly, crosstalk due to the optical coupling between the optical waveguides is increased, and thus the ER is decreased. Accordingly, a transmission loss may be increased. In order to solve this problem, in the technology proposed in the present disclosure, up to the front portion of the curved optical waveguide is made of metamaterial as opposed to a photonic switch based on an existing directional coupler. Thus, the crosstalk may be suppressed from occurring when the optical signal is switched according to the phase transition of the metamaterial, the ER may be remarkably increased, and an optical loss may be reduced.

The grating structure that has a period shorter than a wavelength applies to the structure of the photonic switch based on the directional coupler, the structure including the curved optical waveguide structure. Thus, the element may be reduced to a size of several μm. Two optical waveguides, constituting the directional coupler, that are to be arranged to be in parallel with each other, may be designed in such a manner as to have the same widths or nearly identical widths. Thus, the element may be designed in such a manner that effective refractive indexes thereof are not the same, but somewhat different from each other when a phase transition material is amorphous and that a difference between the effective refractive indexes is increased when the phase transition material is crystal.

Figure 10:
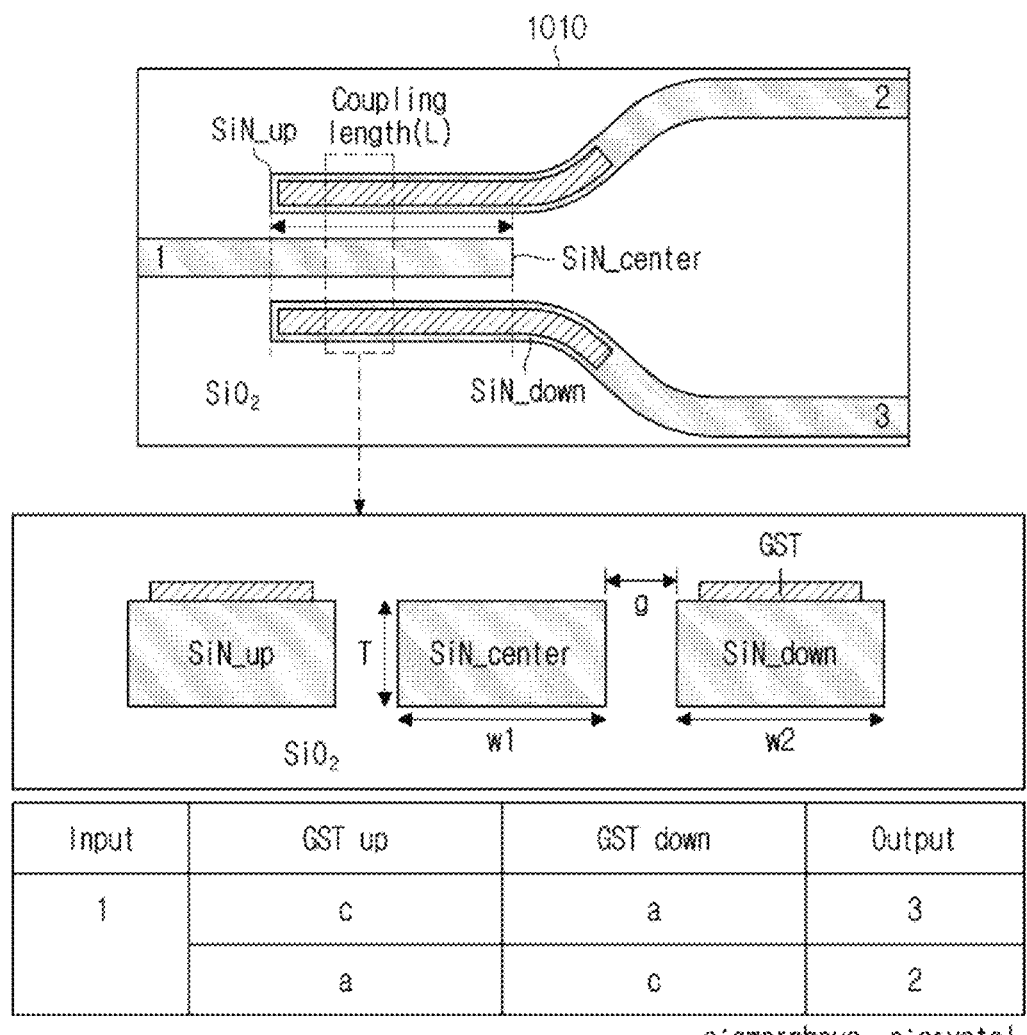
FIG. 10 is a diagram illustrating an example of a structure of a symmetrical 1×2 photonic switch based on a directional coupler according to a seventh embodiment of the present disclosure.

FIG. 10 is a diagram illustrating an example of a structure of a symmetrical 1×2 photonic switch 1010 based on a directional coupler according to a seventh embodiment of the present disclosure. FIG. 10 is a diagram illustrating an outline of the symmetrical 1×2 photonic switch based on the directional coupler. With reference to FIG. 10, the SiN optical waveguide is positioned on the center in the upward-downward direction of the photonic switch 1010. One of two GST/SiN optical waveguides is arranged over the SiN optical waveguide, and the other is arranged below the SiN optical waveguide. The two GST/SiN optical waveguides are configured in such a manner that the SiN optical waveguide and one section of each of the two GST/SiN optical waveguides has a distance of g and that SiN optical waveguide and the other section thereof has a distance of greater than g. In this case, the optical signal that is input into an input port 1 of the SiN optical waveguide may be output to one of an output port 2 and an output port 3 on the basis of the metamaterial included in the two GST/SiN optical waveguides, that is, on the basis of the GST states. For example, as shown in FIG. 10, the optical signal passes through the output port 3 when the GST state of the GST/SiN optical waveguide positioned above is controlled in such a manner as to be crystal and a state of the GST/SiN optical waveguide positioned below is controlled in such a manner as to be amorphous. In addition, as shown in FIG. 10, the optical signal passes through the output port 2 when the GST state of the GST/SiN optical waveguide positioned above is controlled in such a manner as to be amorphous and a state of the GST/SiN optical waveguide positioned below is controlled in such a manner as to be crystal.

Figure 11:
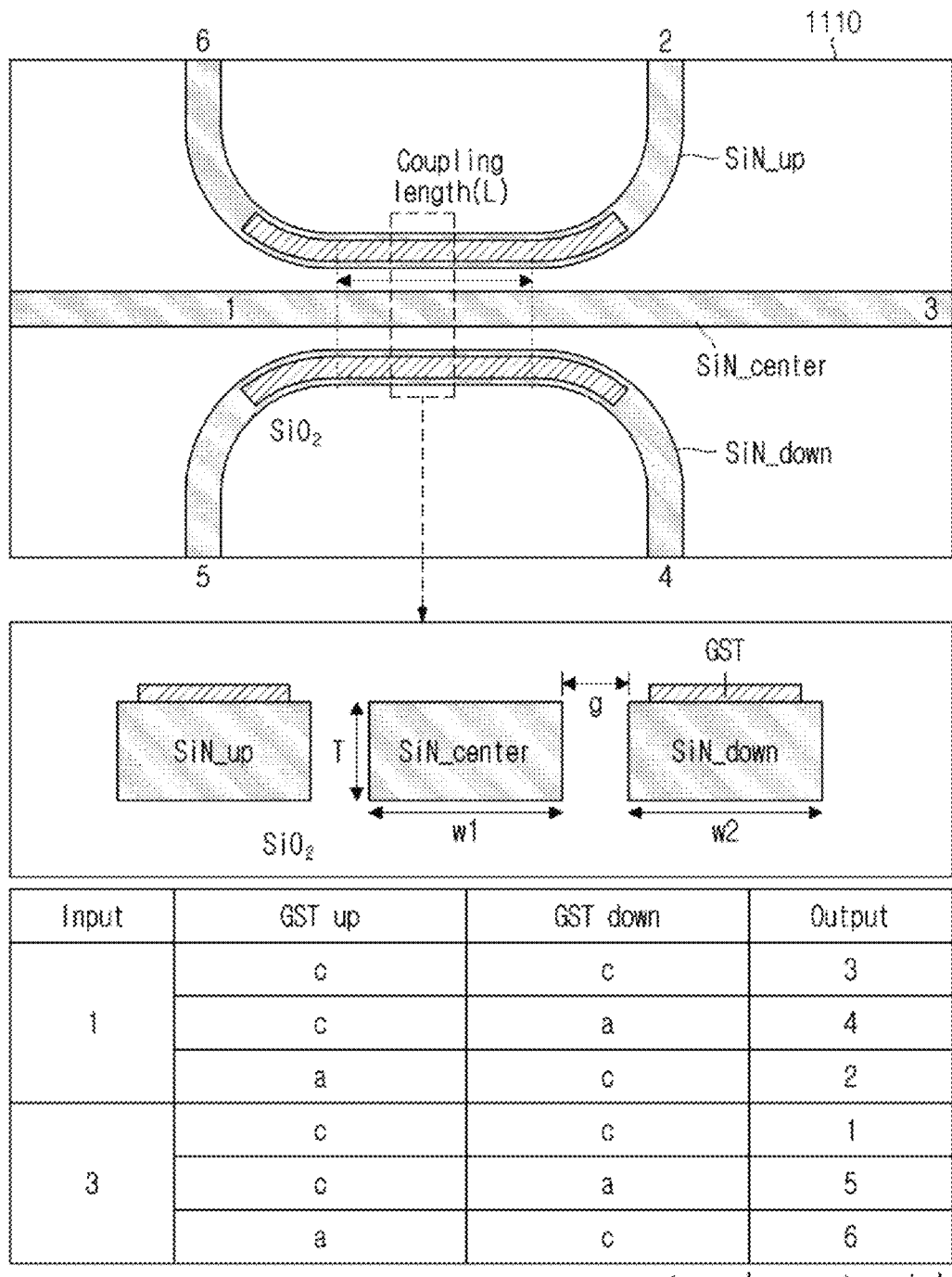
FIG. 11 is a diagram illustrating an example of a structure of a symmetrical bidirectional 1×3 photonic switch based on a directional coupler according to an eighth embodiment of the present disclosure.

FIG. 11 is a diagram illustrating an example of a structure of a symmetrical bidirectional 1×3 photonic switch 1110 based on a directional coupler according to an eighth embodiment of the present disclosure. FIG. 11 is a diagram illustrating an outline of the symmetrical bidirectional 1×3 photonic switch 1110 based on the directional coupler.

With reference to FIG. 11, the photonic switch 1110 is configured with two GST/SiN switches. One end portion of the SiN optical waveguide includes a port 1, and the other end portion thereof include a port 3. One end portion of the GST/SiN optical waveguide positioned above includes a port 6, and the other end portion thereof includes a port 2. One end portion of the GST/SiN optical wave arranged below includes a port 5, and the other end portion thereof includes a port 4. When an optical signal is input in the port 1 or the port 3, the GST state of each of the GST/SiN optical waveguides positioned above and below, as illustrated in FIG. 11, may be adjusted to be crystal or amorphous, and accordingly, the output port may be selected. For example, in a case where the optical signal is input into the port 1, when the GST states of the GST/SiN optical waveguides positioned above and below are both crystal, the optical signal passes through the port 3. In a case where the optical signal is input into the port 1, when the GST state of the GST/SiN optical waveguide positioned above is crystal and the GST state of the GST/SiN optical waveguide positioned below is amorphous, the optical signal passes through the port 4. In a case where the optical signal is input into the port 1, when the GST state of the GST/SiN optical waveguide positioned above is amorphous and the GST state of the GST/SiN optical waveguide positioned below is crystal, the optical signal passes through the port 2. The switching of the optical signal that is input into the port 3 may be performed in the same manner as the above-described switching of the optical signal that is input into the port 1.

Figure 12:
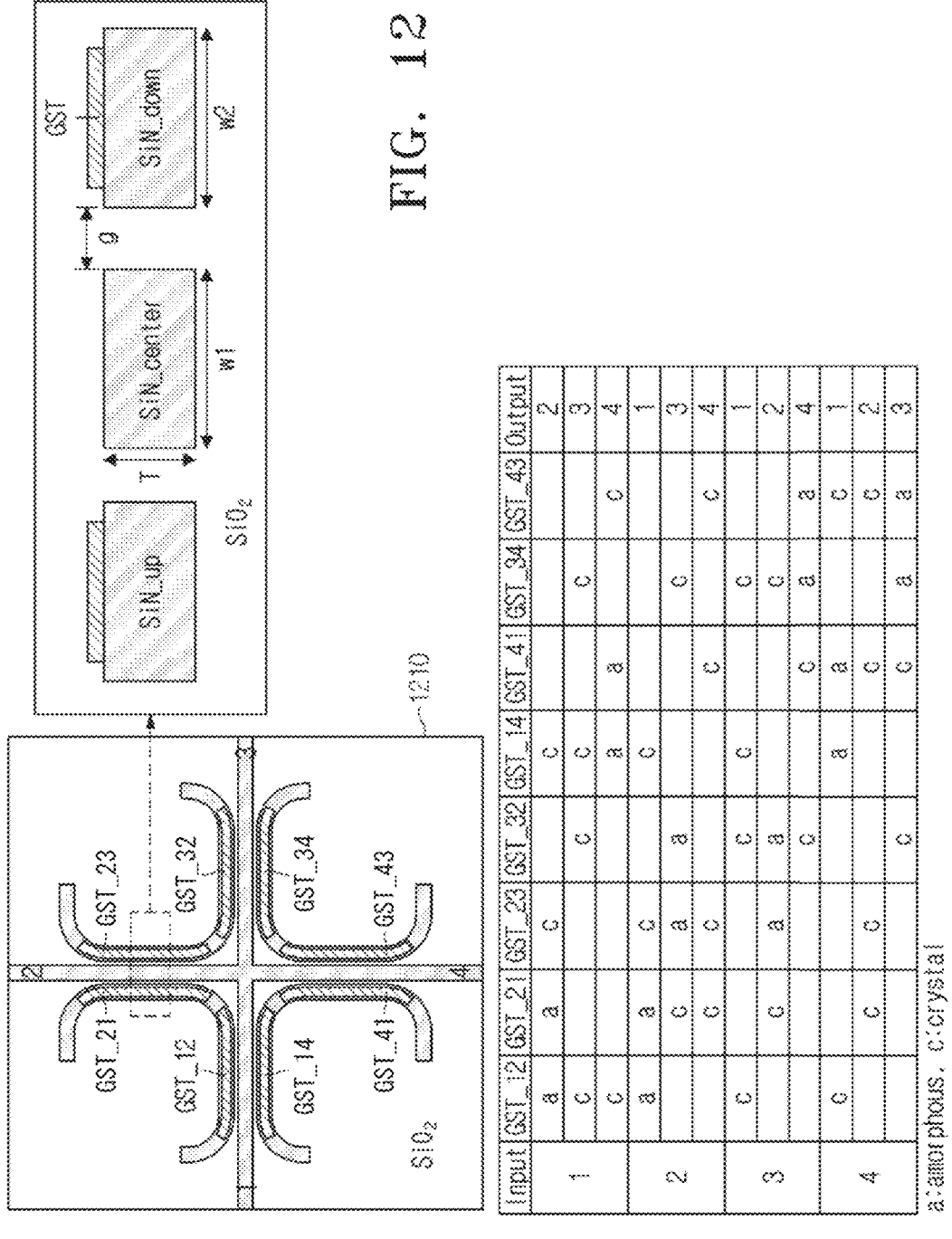
FIG. 12 is a diagram illustrating an example of a structure of a symmetrical four-directional 1×3 photonic switch based on a directional coupler according to a ninth embodiment of the present disclosure.

FIG. 12 is a diagram illustrating an example of a structure of a symmetrical four-directional 1×3 photonic switch 1210 based on a directional coupler according to a ninth embodiment of the present disclosure. FIG. 12 is a diagram illustrating an outline of the symmetrical four-directional 1×3 photonic switch 1210 based on the directional coupler.

With reference to FIG. 12, the photonic switch 1210 is configured with 8 GST/SiN switches. The photonic switch 1210 include two SiN optical waveguides that vertically intersect. One of the two SiN optical waveguides includes the ports 1 and 3, and the other thereof includes the ports 2 and 4. The photonic switch 1210 includes four GST/SiN optical waveguides that are arranged on respective portions, respectively, of the optical waveguides in such a manner to be spaced a distance g apart.

The optical signal that is input into the 1, the port 2, the port 3, or the port 4 may be switched by a combination of the GST states shown in Table in FIG. 12. For example, the optical signal that is input into the port 1 may propagate to the port 2 by adjusting states of GST_12, GST_21, GST_23, and GST_14, as shown in Table. At this point, the remaining GST is not involved in switching the optical signal. The optical signal that is input into the port 1 may be switched to the port 2, the port 3, and the port 4, using this technique. Similarly, each of the optical signals that are input into the port 2, the port 3, and the port 4, respectively, may be switched to the remaining three ports.

Figure 13:
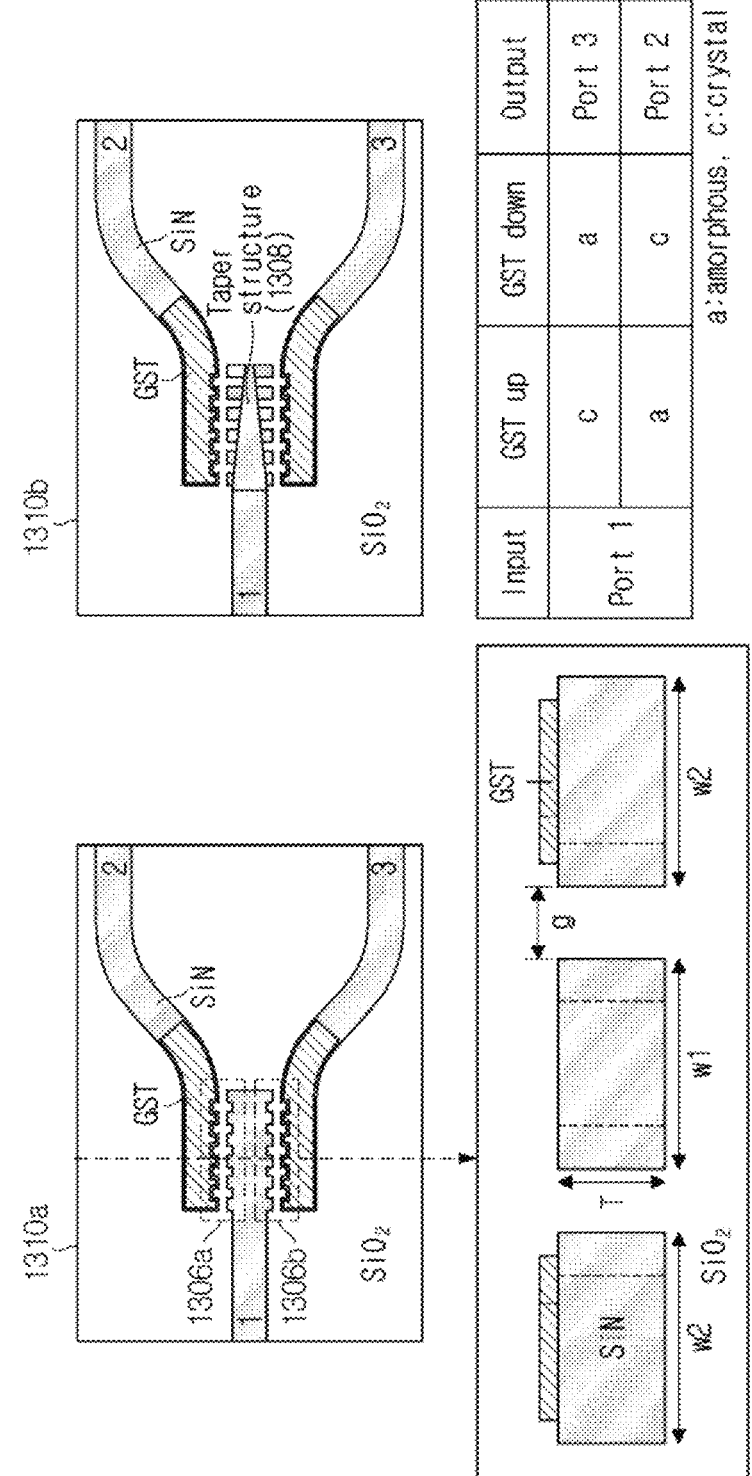
FIG. 13 is a diagram illustrating an example of a structure of a symmetrical 1×2 sub-wavelength grating (SWG) photonic switch based on a directional coupler according to a tenth embodiment of the present disclosure.

FIG. 13 is a diagram illustrating an example of a structure of a symmetrical 1×2 sub-wavelength grating (SWG) photonic switch 1310*a* or 1310 *b* based on a directional coupler according to a tenth embodiment of the present disclosure. FIG. 13 is a diagram illustrating an outline of a symmetrical 1×2 SWG photonic switch 1310*a* or 1310*b* based on the directional coupler.

With reference to FIG. 13, the photonic switch 1310*a* or 1310*b* employs a SWG 1306*a* or 1306*b* structure, respectively. Specifically, the SiN optical waveguide in the center in the upward-downward direction and the GST/SiN optical waveguide positioned above have a distance of g or smaller, and the SWG structure 1306*a* is formed in lateral surfaces, facing each other, of the SiN optical waveguide and the GST/SiN optical waveguide positioned above. The SiN optical waveguide and the GST/SiN optical waveguide positioned below have a distance of g or smaller, and the SWG structure 1306*b* is formed, in lateral surfaces, facing each other, of the SiN optical waveguide and the GST/SiN optical waveguide positioned below. By forming the SWG structures 1306*a* and 1306*b*, the switch may be designed in such a manner that a length is relatively shortened.

In addition, as in the photonic switch 1310*b*, a tapered structure 1308 may be formed in the region of the SiN optical waveguide positioned in the center in the upward-downward direction and where the SWG structures 1306*a* and 1306*b* are formed. A condition for phase matching between the SiN optical waveguide and the a-GST/SiN optical waveguide applies to a structure illustrated in FIG. 13. When the GST state of the GST/SiN optical waveguide positioned above is crystal and the GST state of the GST/SiN optical waveguide positioned below is amorphous, the optical signal passes through the port 3. Conversely, when the GST state of the GST/SiN optical waveguide positioned above is amorphous and the GST state of the GST/SiN optical waveguide positioned below is crystal, the optical signal that is input into the port 1 passes through the port 2. When this symmetrical structure applies, an ER may be relatively increased, and a magnitude of an optical loss that occurs when the optical signal is switched to the port 2 and the port 3 may be uniformed.

As described above, the photonic switch may be designed in such a manner as to have various structures. Moreover, a switching device having a plurality of channels may be configured by structurally arranging a plurality of photonic switches. According to the present disclosure, the switching device including the plurality of photonic switches will be described below with reference to FIGS. 14, 15, and 16. An individual photonic switch may be hereinafter referred to as a "switch element."

Figure 14:
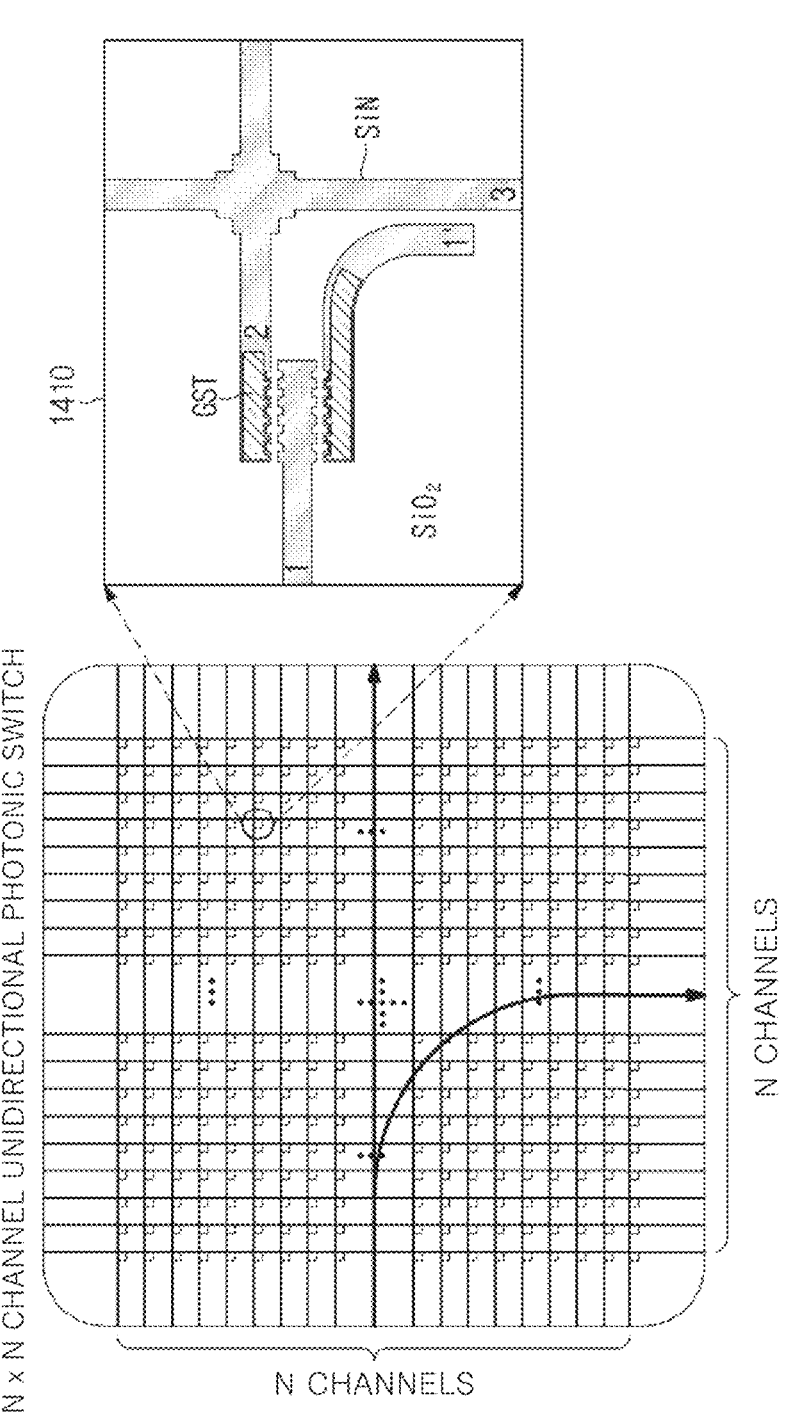
FIG. 14 is a diagram illustrating an example of an N×N channel unidirectional photonic switch according to an eleventh embodiment of the present disclosure.

FIG. 14 is a diagram illustrating an example of an N×N channel unidirectional photonic switch according to an eleventh embodiment of the present disclosure. FIG. 14 is a diagram illustrating an outline of the N×N channel unidirectional photonic switch.

With reference to FIG. 14, in a structure of a switch element 1410 at a position where N×N channel optical waveguides intersect, an output port 2 of a symmetrical 1×2 SWG photonic switch based on the directional coupler vertically intersects an optical waveguide 3. An output port 1' includes a curved-by-90-degree optical waveguide and is coupled to the optical waveguide 3 using the directional coupler. The switch may switch N optical signals input from the leftward direction toward the rightward direction or the downward direction and may operate only in one direction.

Figure 15:
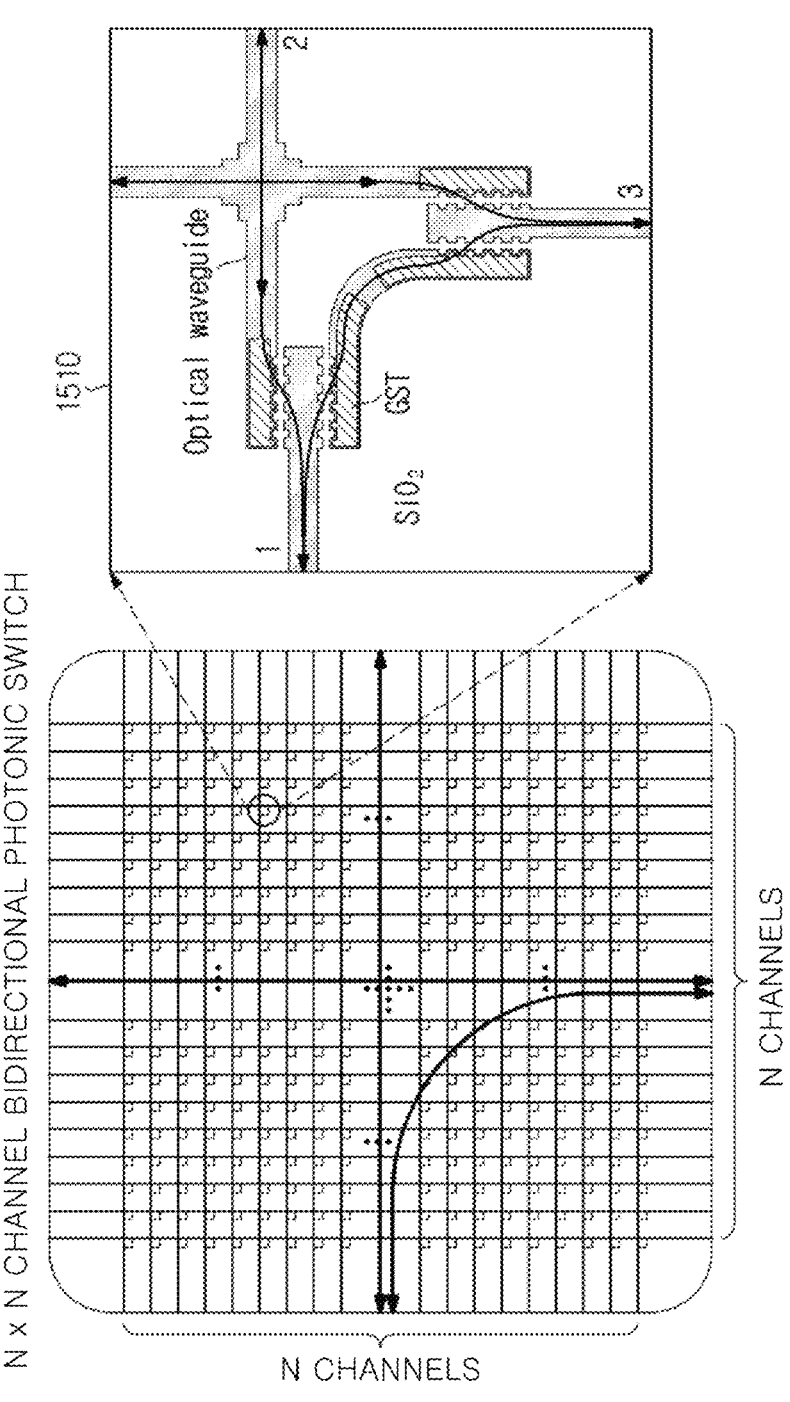
FIG. 15 is a diagram illustrating an example of an N×N channel bidirectional photonic switch according to a twelfth embodiment of the present disclosure.

FIG. 15 is a diagram illustrating an example of an N×N channel bidirectional photonic switch according to a twelfth embodiment of the present disclosure. FIG. 15 is a diagram illustrating an outline of the N×N channel bidirectional photonic switch.

With reference to FIG. 15, a structure of a switch element 1510 at the position where the N×N channel optical waveguides intersect includes two symmetrical 1×2 SWG photonic switches based on two directional couplers. The switch distributes N optical signals input from the leftward direction toward the rightward direction or the downward direction. Conversely, the switch may distribute N optical signals input from the downward direction toward the upward direction of the leftward direction.

Figure 16:
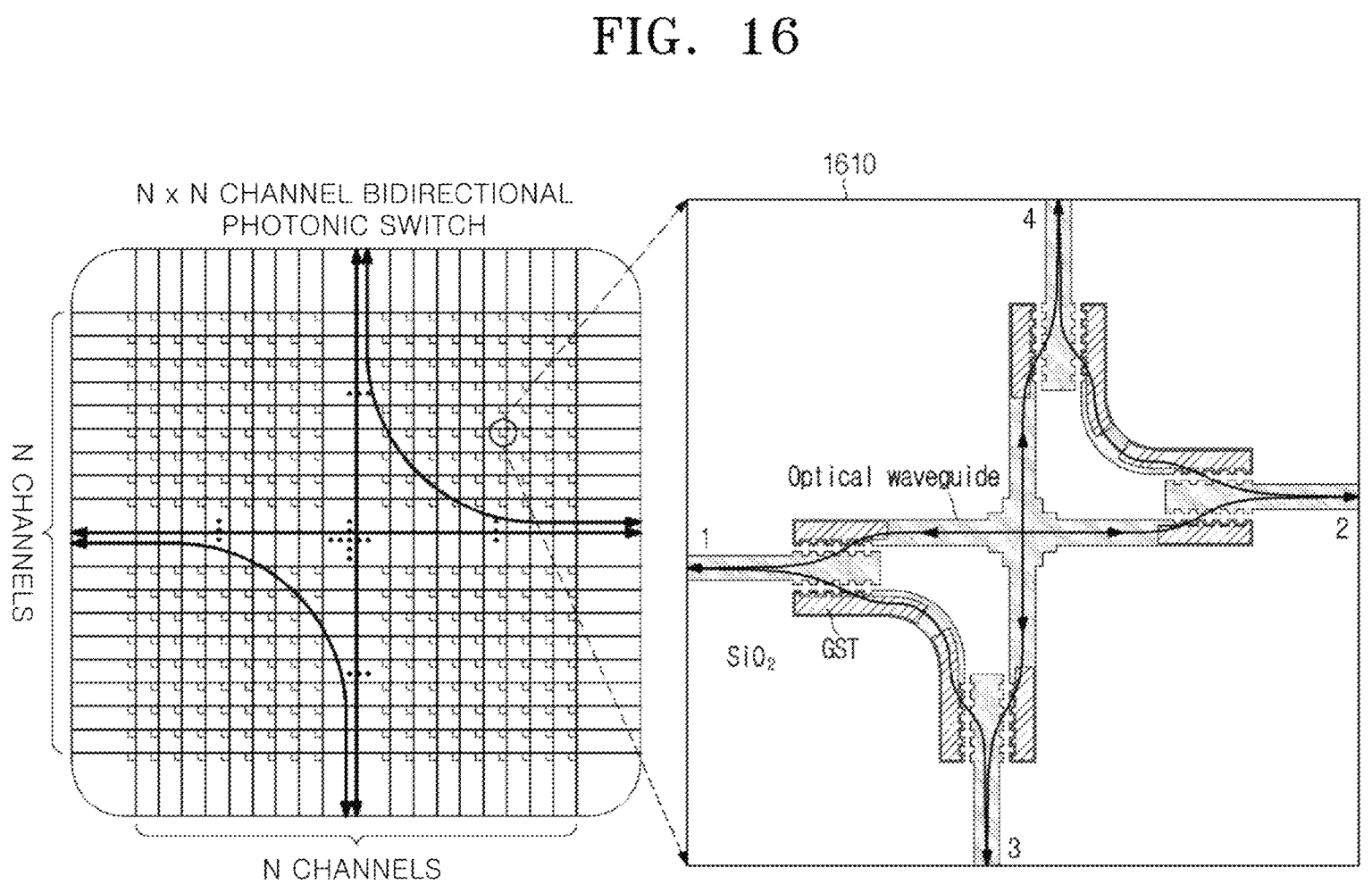

FIG. 16 is a diagram illustrating an example of a structure of an N×N channel bidirectional photonic switch according to a thirteenth embodiment of the present disclosure. FIG. 16 is a diagram illustrating an outline of the N×N channel bidirectional photonic switch.

With reference to FIG. 16, a switch element 1610 at the position where the N×N channel optical waveguides intersect includes four symmetrical 1×2 SWG photonic switches based on four directional couplers. The switch may distribute N optical signals input from the leftward direction toward the rightward direction or the downward direction, may distribute N optical signals input from the downward direction toward the upward direction or the leftward direction, may distribute N optical signals input from the upward direction toward downward direction or the rightward direction, and may distribute N optical signals input from the rightward direction toward the leftward direction or the upward direction.

As described above, with the use of the SWG structure in the symmetrical 1×2 SWG photonic switch based on the directional coupler, it is possible that the length of the switch is further shortened. In addition, it is possible that the tapered structure is formed in the SWG region of the SiN optical waveguide positioned in the center employs. The condition for phase matching between SiN optical waveguide and the a-GST/SiN optical waveguide may apply to this structure. This symmetrical structure makes it possible to increase the ER and to uniform the magnitude of the optical loss that occurs when the optical signal is switched to the port 2 and the port 3.

In order to implement the method according to the present disclosure, one or several other steps may be included in addition to the steps described above. Alternatively, one or several of the steps described above may be omitted. Alternatively, one or several of the steps described above may be omitted, and one or several other steps may be included.

The various embodiments of the present disclosure, which are described above, do not include all possible combinations of the constituent elements and are provided only for descriptions of representative aspects of the present disclosure. The constituent elements described according to the various embodiments may be used independently or in combination.

In addition, the various embodiments of the present disclosure can be implemented in hardware, firmware, or software, or with a combination of these. The various embodiments can be implemented by one or more of the following: Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processor, a controller, a micro controller, a microprocessor, and the like.

The scope of the present disclosure includes a software application or machine-executable commands (for example, an operating system, an application, firmware, a program, and the like) that cause a device or a computer to perform methods according to the various embodiments, and a non-transitory computer-readable medium on which the software application or the commands are recorded in a manner that is executable on the device or the computer.

What is claimed is:

1. A device for switching an optical signal, the device comprising:

a first waveguide constituting an input port and a first output port; and a second waveguide constituting a second output port, wherein the first waveguide has first, second and third sections and is formed of a first material, wherein the second waveguide has first, second and third sections, is formed of the first material, and contains in addition to the first material a second material that experiences phase transition according to temperature, the second material being coupled to an upper end portion of the first material in the first and second sections of the second waveguide, wherein a gap between the first waveguide and the second waveguide uniformly has a first value in the first section of the first waveguide and the first section of the second waveguide, a gap between the first waveguide and the second waveguide has a value increasing from the first value to a second value in the second section of the first waveguide and the second section of the second waveguide, and a gap between the first waveguide and the second waveguide uniformly has a third value in the third section of the first waveguide and the third section of the second waveguide, wherein at least one portion of the first section of the first waveguide overlaps at least one portion of the first section of the second waveguide, and at least one portion of the second section of the first waveguide overlaps at least one portion of the second section of the second waveguide, and wherein a grating structure applies to the first waveguide and the second waveguide in the at least one portion of the first section of the first waveguide and the at least one portion of the first section of the second waveguide.

2. The device of claim 1, wherein the grating structure applies to the first material and the second material in the at least one portion of the first section of the first waveguide and the at least one portion of the first section of the second waveguide.

3. The device of claim 1, wherein the grating structure is disposed at a front end of the second waveguide.

4. The device of claim 1, wherein the grating is disposed at one end of the second waveguide.

5. The device of claim 1, wherein the second material in the first and second sections of the second waveguide has a narrower width than a width of the first material in the third section of the second waveguide.

6. The device of claim 1, wherein the grating structure is formed in lateral surfaces of the first waveguide and the second waveguide, the lateral surfaces facing each other.

7. The device of claim 1, wherein the first material contains SiN, and the second material contains $Ge_2Sb_2Te_5$ (GST).

8. The device of claim 1, wherein the grating structure is in the form of a grating with a period shorter than a wavelength of the optical signal.

9. The device of claim 1, wherein, in a case where the optical signal is input into the input port and needs to be output to the first output port, the second material is controllable in such a manner as to be in a crystal state.

10. The device of claim 1, wherein, in a case where the optical signal is input into the input port and needs to be output to the second output port, the second material is controllable in such a manner as to be in an amorphous state.

11. The device of claim 1, wherein whether or not the first waveguide and the second waveguide are matched in mode with each other is determined based on a state of the second material.

12. The device of claim 11, wherein, in a case where the second material is in an amorphous state, the first waveguide and the second waveguide are matched in mode with each other, and wherein, in a case where the second material is in a crystal state, the first waveguide and the second waveguide are mismatched in mode with each other.

13. The device of claim 11, wherein, in a case where the second material is in an amorphous state, the first waveguide and the second waveguide are relatively less mismatched in mode with each other than in a case where the second material is in a crystal state.

14. A device for switching an optical signal, the device comprising:

a first waveguide constituting a first port;

a second waveguide constituting a second port; and a third waveguide constituting a third port, wherein the first waveguide is formed of a first material, wherein the second waveguide is formed of the first material, and contains, in addition to the first material, a first metamaterial as a second material that experiences phase transition according to temperature, the second material being coupled to an upper end portion of the first material in one section of the second waveguide, wherein the third waveguide is formed of the first material, and contains, in addition to the first material, a second metamaterial as the second material that experiences phase transition according to temperature, the second material being coupled to an upper end portion of the first material in one section of the third waveguide, wherein the optical signal is input into the first port and is output to one of the second port and the third port on the basis of a combination of a state of the first metamaterial and a state of the second metamaterial, wherein the first waveguide and the second waveguide have a gap that is at or below a threshold value, and a grating structure is formed in lateral surfaces of the first waveguide and the second waveguide, the lateral surfaces facing each other, and wherein the first waveguide and the third waveguide have a gap that is at or below the threshold value, and a grating structure is formed in lateral surfaces of the first waveguide and the third waveguide, the lateral surfaces facing each other.

15. The device of claim 14, wherein the first waveguide has the first port on one end portion thereof and has a fourth port on another end portion thereof, wherein the second waveguide has the second port on one end portion thereof and has a fifth port on another end portion thereof, wherein the third waveguide has the third port on one end portion thereof and has a sixth port on another end portion thereof, wherein the optical signal that is input into the first port is output to one of the second port, the third port, and the fourth port on the basis of the combination of the state of the first metamaterial and the state of the second metamaterial, and wherein, when the optical signal is input into the fourth port, the optical signal is output to one of the fifth port, the sixth port, and the first port on the basis of the combination of the state of the first metamaterial and the state of the second metamaterial.

16. The device of claim 14, wherein a tapered structure is formed in a region of the first waveguide, the region employing the grating structure.

17. The device of claim 14, the device further comprising:

a fourth waveguide perpendicularly intersecting the second waveguide and, along with the third waveguide, forming a structure of a directional coupler; and a plurality of switch elements, each including the first waveguide, the second waveguide, the third waveguide, and the fourth waveguide, wherein the plurality of switch elements are arranged in a two-dimensional geometric array, and wherein a plurality of optical signals that are input into switch elements, respectively, in a first column are output to switch elements, respectively, in a last column or to switch elements, respectively, in a last row, on the basis of states of first and second metamaterials contained in the plurality of switch elements, respectively.

18. The device of claim 14, further comprising:

a fourth waveguide perpendicularly intersecting the second waveguide; and a fifth waveguide, along with the third waveguide and, along with the fourth waveguide, forming a directional coupler; and a plurality of switch elements, each including a set of the first waveguide, the second waveguide, the third waveguide, the fourth waveguide, and the fifth waveguide, wherein the plurality of switch elements are arranged in a two-dimensional geometric array, wherein a plurality of optical signals that are input into switch elements, respectively, in a first column are output to switch elements, respectively, in a last column or to switch elements, respectively, in a last row, on the basis of states of metamaterials contained in the plurality of switch elements, respectively, and wherein a plurality of optical signals that are input into switch elements, respectively, in the last row are output to switch elements, respectively, in the first row or to switch elements, respectively, in the first column, on the basis of states of the metamaterials contained in the plurality of switch elements, respectively.

19. A device for switching an optical signal, the device comprising:

a first waveguide constituting a first port and a second port;

a second waveguide constituting a third port and a fourth port, the second waveguide perpendicularly intersecting the first waveguide;

a third waveguide arranged along the first waveguide in such a manner that a region, adjacent to the first port, of the third waveguide and the first port forms a gap that is at or below a threshold value, the third waveguide further being arranged along the second waveguide in such a manner that a region, adjacent to the third port, of the third waveguide and the third port has a gap that is at or below the threshold value;

a fourth waveguide arranged along the first waveguide in such a manner that a region, adjacent to the second port, of the fourth waveguide and the second port has a gap that is at or below the threshold value, the fourth waveguide further being arranged along the second waveguide in such a manner that a region, adjacent to the third port, of the fourth waveguide and the third port has a gap that is at or below the threshold value;

a fifth waveguide arranged along the first waveguide in such a manner that a region, adjacent to the first port, of the fifth waveguide and the first port has a gap that is at or below the threshold value, the fifth waveguide further being arranged along the second waveguide in such a manner that a region, adjacent to the fourth port, of the fifth waveguide and the fourth port has a gap that is at or below the threshold value; and a sixth waveguide arranged along the first waveguide in such a manner that a region, adjacent to the second port, of the sixth waveguide and the second port has a gap that is at or below the threshold value, the sixth waveguide further being arranged along the second waveguide in such a manner that a region, adjacent to the fourth port, of the sixth waveguide and the fourth port has a gap that is at or below the threshold value, wherein the first waveguide and the second waveguide are formed of a first material, wherein each of the third waveguide, the fourth waveguide, the fifth waveguide, and the sixth waveguide is formed of the first material, and contains, in addition to the first material, a second material that experiences phase transition according to temperature, the second material being coupled to an upper end portion of the first material in one section, and wherein an optical signal that is input into the first port is output to one of the second port, the third port, and the fourth port on the basis of a combination of states of metamaterials contained in the third waveguide, the fourth waveguide, the fifth waveguide, and the sixth waveguide, respectively.

* * * * *